United States Patent
Sakemi et al.

(10) Patent No.: US 9,712,499 B2
(45) Date of Patent: Jul. 18, 2017

(54) METHOD AND APPARATUS FOR CRYPTOGRAPHIC PROCESSING

(71) Applicant: FUJITSU LIMITED, Kawasaki-shi, Kanagawa (JP)

(72) Inventors: Yumi Sakemi, Kawasaki (JP); Tetsuya Izu, London (GB); Masahiko Takenaka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 58 days.

(21) Appl. No.: 14/667,832

(22) Filed: Mar. 25, 2015

(65) Prior Publication Data
US 2015/0281188 A1    Oct. 1, 2015

(30) Foreign Application Priority Data
Mar. 31, 2014 (JP) ................................. 2014-070845

(51) Int. Cl.
H04L 29/06 (2006.01)
H04L 9/32 (2006.01)
(Continued)

(52) U.S. Cl.
CPC ........ *H04L 63/0428* (2013.01); *H04L 9/3231* (2013.01); *H04L 63/0478* (2013.01);
(Continued)

(58) Field of Classification Search
CPC ............... H04L 63/0428; H04L 63/061; H04L 63/0861; H04L 63/0478; H04L 9/3231; G06F 21/32
See application file for complete search history.

(56) References Cited

U.S. PATENT DOCUMENTS 5,418,854 A    5/1995    Kaufman et al.
5,835,599 A    11/1998   Buer
(Continued)

FOREIGN PATENT DOCUMENTS

JP    10-075240 A     3/1998
JP    2001-209583 A   8/2001
JP    2005-130384 A   5/2005

OTHER PUBLICATIONS

Lee, Chin-Feng, et al. "Two-party and three-party remote user authentication schemes using biometric data only for emergency." Aware Computing (ISAC), 2010 2nd International Symposium on. IEEE, 2010.*

(Continued)

*Primary Examiner* — Michael Simitoski
(74) *Attorney, Agent, or Firm* — Fujitsu Patent Center

(57) ABSTRACT

A cryptographic processing apparatus that holds a first key, and receives authentication object data upon authentication includes a communication unit and a computing unit. The communication unit communicates with a calculation apparatus and a determination apparatus. In the calculation apparatus, encrypted registration data obtained by encrypting registration data twice, once with the first key and once with a second key, is registered. The registration data is data against which the authentication object data is verified. The determination apparatus uses the second key upon the authentication. When registering the encrypted registration data in the calculation apparatus, the computing unit generates a key different from the first key, generates encrypted data by encrypting the registration data twice, once with the first key and once with the different key, transmits the different key to the determination apparatus, and the encrypted data to the calculation apparatus, through the communication unit.

7 Claims, 19 Drawing Sheets

(51) Int. Cl.
*G06F 21/00* (2013.01)
*G06F 21/32* (2013.01)

(52) U.S. Cl.
CPC ........ H04L 63/061 (2013.01); H04L 63/0861 (2013.01); *G06F 21/32* (2013.01)

(56) References Cited

U.S. PATENT DOCUMENTS

| | | | | |
|---|---|---|---|---|
| 6,317,834 | B1* | 11/2001 | Gennaro | G06F 21/32 380/286 |
| 8,566,247 | B1* | 10/2013 | Nagel | H04L 63/045 380/270 |
| 2002/0154779 | A1 | 10/2002 | Asano et al. | |
| 2003/0140235 | A1* | 7/2003 | Immega | G06F 21/32 713/186 |
| 2003/0195935 | A1* | 10/2003 | Leeper | G06F 21/32 709/206 |
| 2006/0282901 | A1* | 12/2006 | Li | G06F 21/606 726/26 |
| 2007/0050303 | A1* | 3/2007 | Schroeder | G06F 21/32 705/67 |
| 2007/0156587 | A1* | 7/2007 | Yu | G06F 21/10 705/50 |
| 2008/0203155 | A1* | 8/2008 | Ahnert | G06F 21/32 235/380 |
| 2010/0060411 | A1* | 3/2010 | Ikegami | G06K 9/00892 340/5.53 |
| 2015/0149776 | A1* | 5/2015 | Chastain | H04L 63/0869 713/169 |
| 2016/0156464 | A1* | 6/2016 | Naslund | H04L 9/0822 713/171 |

OTHER PUBLICATIONS

Menezes, Alfred J. et al. Handbook of Applied Cryptography, 1997 CRC Press, LLC, pp. 543-590.*

Haruki Ota et al., "Proposal of an Iris Identification Scheme Protecting Privacy", Computer Security Symposium 2003, Oct. 2003, pp. 163-168 (6 pages).

* cited by examiner

| ID | ENCRYPTED REGISTRATION DATA |
|---|---|
| A | $E_{KA2}(E_{KA1}(m_A))$ |
| B | $E_{KB2}(E_{KB1}(m_B))$ |
| ⋮ | ⋮ |

FIG. 10

METHOD AND APPARATUS FOR CRYPTOGRAPHIC PROCESSING

CROSS-REFERENCE TO RELATED APPLICATION

This application is based upon and claims the benefit of priority of the prior Japanese Patent Application No. 2014-070845, filed on Mar. 31, 2014, the entire contents of which are incorporated herein by reference.

FIELD

The embodiments discussed herein are related to a method and an apparatus for cryptographic processing.

BACKGROUND

Systems in financial institutions and systems for electronic commerce and the like need a high level of security. Therefore, these systems use advanced authentication techniques. Recently, techniques such as biometric authentication or the like based on biological information of the user have been used, in addition to password authentication based on a password specified by the user.

A system that uses biometric authentication reads biological information from the user at the time of authentication. Then, the system compares the read biological information with template data, which is biological information registered in advance, so as to determine the degree of similarity therebetween. That is, the biological information read by the system is used as information to be authenticated (hereinafter "authentication object information"), and the template data is used as authentication information. If the authentication object information and the authentication information match within an acceptable tolerance, the authentication is determined to have succeeded. If not, the authentication is determined to have failed.

Examples of biological information include patterns of fingerprints, veins, iris, and the like. These types of biological information are unique to each individual and are unchangeable. Therefore, template data is managed with great care. For example, template data is encrypted and registered in an authentication server. However, if a mechanism is employed that decrypts the encrypted template data into the original template data at the time of authentication and compares biological information obtained from a user with the original template data, there is a risk of the decrypted template data and the obtained biological information being stolen by a malicious third party.

There has been proposed a method that, in order to reduce the above risk, compares encrypted data of biological information read from the user with encrypted template data without decrypting either the biological information or the template data, and calculates a Hamming distance between the biological information and the template data. This technique uses an exclusive-OR operation (hereinafter represented also by the symbol "^") when encrypting data.

For example, a function that calculates an exclusive OR of an encryption key K and input information X, and a function in CTR (Counter) mode of Advanced Encryption Standard (AES) encryption may be used as a function $E_K(X)$ that encrypts data X with the encryption key K. Note that in place of the encryption key K serving as key information, random numbers generated by the encryption key K may be used for encryption. In the following description, such a function will be given by $E_K(X)=K\hat{} X$, using the symbol "^".

An expression $E_K(X1)\hat{} E_K(X2)=(X1\hat{} K)\hat{} (X2\hat{} K)=X1\hat{} X2=HV$ holds, where X1 is biological information read from the user, X2 is template data, K is an encryption key, and HV is a Hamming vector representing the difference between the biological information X1 and the template data X2. Accordingly, if the above operation is used, it is possible to evaluate the degree of match between the biological information and the template data while maintaining an encrypted state thereof, based on the length (Hamming distance) of the Hamming vector HV, and thus to reduce the risk of the biological information being leaked.

See, for example, Japanese Laid-open Patent Publication No. 2005-130384; and Haruki Ota, Yoshiji Sasano, and Fumiaki Sugaya, "Proposal of an iris identification scheme protecting privacy", Computer Security Symposium 2003, pp. 163-168.

The proposed technique described above is designed for application to an authentication system that performs authentication between two parties, that is, between a terminal apparatus to which the user inputs biological information and an authentication server. Thus, the above-described technique is not designed for an authentication system that performs authentication between a terminal apparatus to which the user inputs biological information, a server (hereinafter, "calculation apparatus") which stores encrypted template data, and a server (hereinafter, "determination apparatus") that determines whether authentication is successful.

For example, consider a mechanism in which a terminal apparatus transmits encrypted biological information to a calculation apparatus and then the calculation apparatus generates distance information representing the difference between the biological information and template data while maintaining an encrypted state thereof. Note that, a determination apparatus determines whether authentication is successful based on distance information generated by the calculation apparatus. Further, in order to improve the security, the template data is encrypted twice with two encryption keys and stored in the calculation apparatus. One of the keys is stored in the terminal apparatus, while the other one of the keys is stored in the determination apparatus.

In the above case, registering template data in the calculation apparatus involves a process of encrypting the template data with the encryption key stored in the terminal apparatus, encrypting again the template data with the encryption key stored in the determination apparatus, and registering the template data in the calculation apparatus. That is, the determination apparatus registers data in the calculation apparatus in the end. Thus, there is a risk of data being fraudulently registered by the determination apparatus without being noticed by the terminal apparatus. For example, if data that makes a Hamming vector obtained by an exclusive-OR operation with the arbitrary biological information encrypted by the terminal apparatus sufficiently small is fraudulently registered, there arises a risk of authentication succeeding regardless of biological information input in the terminal apparatus.

SUMMARY

According to one aspect of the disclosure, there is provided a non-transitory computer-readable storage medium storing a computer program that causes a computer, which holds a first key, and receives authentication object data upon authentication, to perform a process including: generating a key different from the first key and transmitting the different key to a determination apparatus, when registering encrypted registration data in a calculation apparatus by communicating with the calculation apparatus and the determination apparatus that uses a second key upon the authentication, the encrypted registration data being obtained by encrypting registration data twice, once with the first key and once with the second key, the registration data being data against which the authentication object data is verified; and generating encrypted data by encrypting the registration data twice, once with the first key and once with the different key, and transmitting the encrypted data to the calculation apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 illustrates an example of encrypted registration data according to the second embodiment;

DESCRIPTION OF EMBODIMENTS

Figure 1:
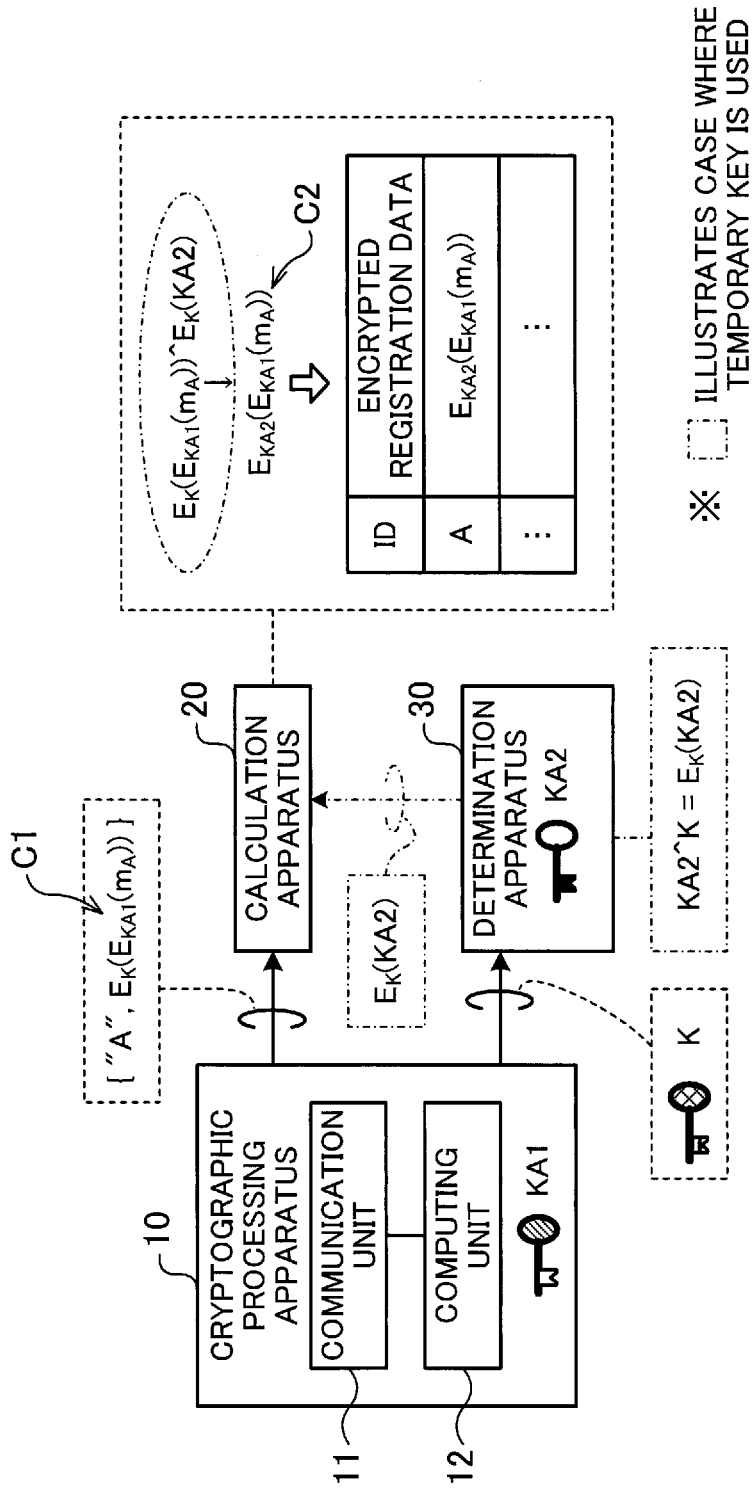
FIG. 1 illustrates an example of a cryptographic processing apparatus according to a first embodiment.

Hereinafter, embodiments will be described with reference to the accompanying drawings. Like reference numerals refer to like elements throughout, and a description of like elements will not be repeated.

(1) First Embodiment

A first embodiment will be described with reference to FIG. 1. FIG. 1 illustrates an example of a cryptographic processing apparatus according to a first embodiment. A cryptographic processing apparatus 10 is an example of the cryptographic processing apparatus according to the first embodiment. In the drawings and the following discretion, an exclusive-OR operation and a function in CTR mode for AES encryption may be represented by the symbol "^" for convenience of display. Note that in place of an encryption key K, random numbers generated by the encryption key K may be used for encryption.

As illustrated in FIG. 1, the cryptographic processing apparatus 10 includes a communication unit 11 and a computing unit 12. Note that the cryptographic processing apparatus 10 may further include a volatile storage device (not illustrated) such as a random access memory (RAM) and the like, and a non-volatile storage device (not illustrated) such as a hard disk drive (HDD), a flash memory, and the like. The cryptographic processing apparatus 10 is capable of communicating with a calculation apparatus 20 and a determination apparatus 30. It is desirable to apply an encrypted communication technique such as, for example, the Secure Socket Layer (SSL) and the like to the communication line used for communication with each apparatus.

The communication unit 11 is a communication circuit, a network interface, or the like for communicating with the calculation apparatus 20 and the determination apparatus 30 via a wired or wireless communication line. The computing unit 12 is a processor such as a central processing unit (CPU), a digital signal processor (DSP), and the like. Alternatively, the computing unit 12 may be an electronic circuit such as an application specific integrated circuit (ASIC), a field programmable gate array (FPGA), and the like. The computing unit 12 executes programs stored in a memory such as a non-volatile storage device and other portable storage media, for example.

The cryptographic processing apparatus 10 holds a first key KA1, and receives authentication object data upon authentication. In the calculation apparatus 20, encrypted registration data C2 obtained by encrypting registration data $m_A$ twice, once with the first key KA1 and once with a second key KA2, is registered. The registration data $m_A$ is data against which the authentication object data is verified. The determination apparatus 30 uses the second key KA2 upon the authentication.

The registration data $m_A$ is an example of authentication information. The authentication object data is an example of authentication object information. The registration data $m_A$ and the authentication object data may be, for example, biological information of the user, or a physical unclonable function (PUF) of an electronic circuit managed by the cryptographic processing apparatus 10 or the user.

When registering the encrypted registration data C2 in the calculation apparatus 20, the computing unit 12 generates a key K different from the first key KA1. Further, the computing unit 12 generates encrypted data C1 by encrypting the registration data $m_A$ twice, once with the first key KA1 and once with the different key K. Further, the computing unit 12 transmits the different key K to the determination apparatus 30 through the communication unit 11.

For example, the computing unit 12 calculates an exclusive OR of the first key KA1, the different key K, and the registration data $m_A$ ($m_A\string^KA1\string^K=E_K(E_{KA1}(m_A))$), and transmits the calculation result as encrypted data C1 to the calculation apparatus 20. In this step, the computing unit 12 transmits, to the calculation apparatus 20, ID (A) of a user A for whom the registration data $m_A$ is registered. Further, the computing unit 12 transmits the encrypted data C1 to the calculation apparatus 20 through the communication unit 11.

(Case Where K=KA2)

For example, if the different key K is the second key KA2, the encrypted data C1 is identical to the encrypted registration data C2. Accordingly, the calculation apparatus 20 performs registration of the encrypted registration data C2, using the encrypted data C1. Further, the determination apparatus 30 holds the different key K received from the cryptographic processing apparatus 10 as the second key KA2.

(Case Where K=Temporary Key)

As another example, assume that the different key K is a temporary key that is newly generated each time the encrypted registration data C2 is registered in the calculation apparatus 20. In this case, the determination apparatus 30 generates encrypted key data by encrypting the second key KA2 that is held therein in advance, using the different key K (temporary key) received from the cryptographic processing apparatus 10. Then, the determination apparatus 30 transmits the encrypted key data to the calculation apparatus 20. For example, the determination apparatus 30 calculates an exclusive OR of the different key K and the second key KA2 ($KA2\string^K=E_K(KA2)$), and transmits the calculation result as encrypted key data to the calculation apparatus 20.

Having received the encrypted key data, the calculation apparatus 20 generates encrypted registration data C2, using the encrypted data C1 and the encrypted key data. For example, the calculation apparatus 20 calculates an exclusive OR of the encrypted data C1 and the encrypted key data ($E_K(EK_{A1}(m_A))\string^E_K(KA2)=E_{KA2}(E_{KA1}(m_A))$), and obtains the calculation result as encrypted registration data C2. Then, the calculation apparatus 20 performs registration of the encrypted registration data C2.

In both cases, the encrypted data C1 obtained by encrypting the registration data $m_A$ is directly transmitted from the cryptographic processing apparatus 10 to the calculation apparatus 20. Thus, upon registration of the encrypted registration data C2, it is possible to reduce the risk of fraudulent data being registered in the calculation apparatus 20 by the determination apparatus 30 without being noticed by the cryptographic processing apparatus 10.

The above is a description of the first embodiment.

(2) Second Embodiment

The following describes a second embodiment. The second embodiment relates to an authentication system using a scheme (hereinafter referred to as a "redundant Vernam cipher scheme") that encrypts each of authentication object information and authentication information twice by an encryption process based on an exclusive-OR operation. Note that in the drawings and the following discretion, an exclusive-OR operation and a function in CTR mode for AES encryption may be represented by the symbol "$\string^$" for convenience of display. Further, data obtained by encrypting data X with an encryption key K may be represented as "$E_K(X)$". Note that in place of the encryption key K, random numbers generated by the encryption key K may be used for encryption.

(Characteristics of Exclusive-OR Operation)

The following describes the characteristics of the exclusive-OR operation.

According to the exclusive-OR operation, $(X1\string^X2)\string^X2=X1$ holds, where X1 and X2 are arbitrary bit strings. That is, two identical bit strings X2 cancel each other out in the exclusive-OR operation. Further, $X1\string^X2=X2\string^X1$ holds. Accordingly, $E_{K1}(E_X(X1))\string^E_{K2}(E_X(X2))=(X1\string^K\string^K1)\string^(X2\string^K\string^K2)=(X1\string^X2)\string^K1\string^K2=E_{X1}(E_{X2})(HV))$ holds, where $HV \equiv X1\string^X2$.

The authentication system of the second embodiment uses the above-described characteristics of the exclusive-OR operation. Note that the authentication system of the second embodiment may be constructed using another encryption function having these characteristics, in place of the exclusive-OR operation. It is obvious that such a modification also falls within the technical scope of the second embodiment.

(2-1) Authentication System

Figure 2:
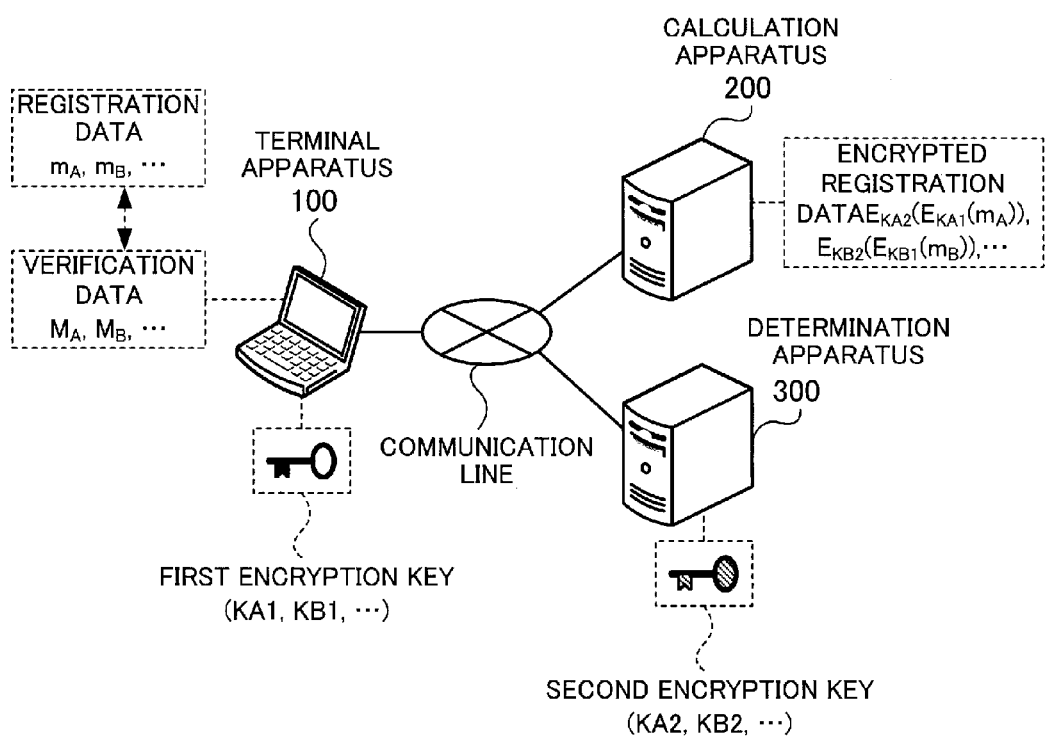
FIG. 2 illustrates an example of an authentication system according to a second embodiment.

An authentication system according to the second embodiment will be described with reference to FIG. 2. FIG. 2 illustrates an example of an authentication system according to the second embodiment.

As illustrated in FIG. 2, the authentication system of the second embodiment includes a terminal apparatus 100, a calculation apparatus 200, and a determination apparatus 300.

The terminal apparatus 100, the calculation apparatus 200, and the determination apparatus 300 are connected to each other via a communication line. The communication line may be, for example, a dedicated line that safely connects between the terminal apparatus 100 and the calculation apparatus 200, between the terminal apparatus 100 and the determination apparatus 300, and between the calculation apparatus 200 and the determination apparatus 300. Further, it is preferable to use a public communication network as a communication line, and employ a method that ensures security using a technique such as SSL, virtual private network (VPN), and the like.

In the case where the authentication system is applied to systems in financial institutions, for example, an automated teller machine (ATM) terminal having a function of reading the vein pattern of the palm, finger, or the like is an example of the terminal apparatus 100. Further, in the case where the authentication system is applied to systems for electronic commerce and electronic payment, a user's computer connected to a device for reading fingerprint, iris pattern, and the like is an example of the terminal apparatus 100. Other than these examples, the authentication system of the second embodiment may be applied to arbitrary systems that provide an authentication service.

Verification data $M_A$, verification data $M_B$, and so on are input to the terminal apparatus 100. The verification data $M_A$, verification data $M_B$, and so on are examples of authentication object information. Further, the verification data $M_A$, verification data $M_B$, and so on are respectively verified against registration data $m_A$, registration data $m_B$, and so on, which are authentication information. The terminal apparatus 100 holds first encryption keys KA1, KB1, and so on. The first encryption keys KA1, KB1, and so on are used for encryption of the verification data $M_A$, verification data $M_B$, and so on, respectively. The calculation apparatus 200 holds encrypted registration data $E_{KA2}(E_{KA1}(m_A))$, encrypted registration data $E_{KB2}(E_{KB1}(m_B))$, and so on. The determination apparatus 300 holds second keys KA2, KB2, and so on.

The encrypted registration data $E_{KA2}(E_{KA1}(m_A))$ is data obtained by encrypting the registration data $m_A$ with the first encryption key KA1 and the second encryption key KA2. That is, the encrypted registration data $E_{KA2}(E_{KA1}(m_A))$ is given by equation (1) below. Further, the encrypted registration data $E_{KB2}(E_{KB1}(m_B))$ is data obtained by encrypting the registration data $m_B$ with the first encryption key KB1 and the second encryption key KB2. That is, the encrypted registration data $E_{KB2}(E_{KB1}(m_B))$ is given by equation (2) below.

$$E_{KA2}(E_{KA1}(m_B))=m_A{}^\wedge KA1{}^\wedge KA2 \quad (1)$$

$$E_{KB2}(E_{KB1}(m_B))=m_B{}^\wedge KB1{}^\wedge KB2 \quad (2)$$

In the following description, for ease of explanation, the authentication system illustrated in FIG. 2 is assumed. Further, the following description focuses on a process of verifying the verification data $M_A$ against the registration data $m_A$, and a process of registering the encrypted registration data $E_{KA2}(E_{KA1}(m_A))$.

(Example of Verification Process)

Figure 3:
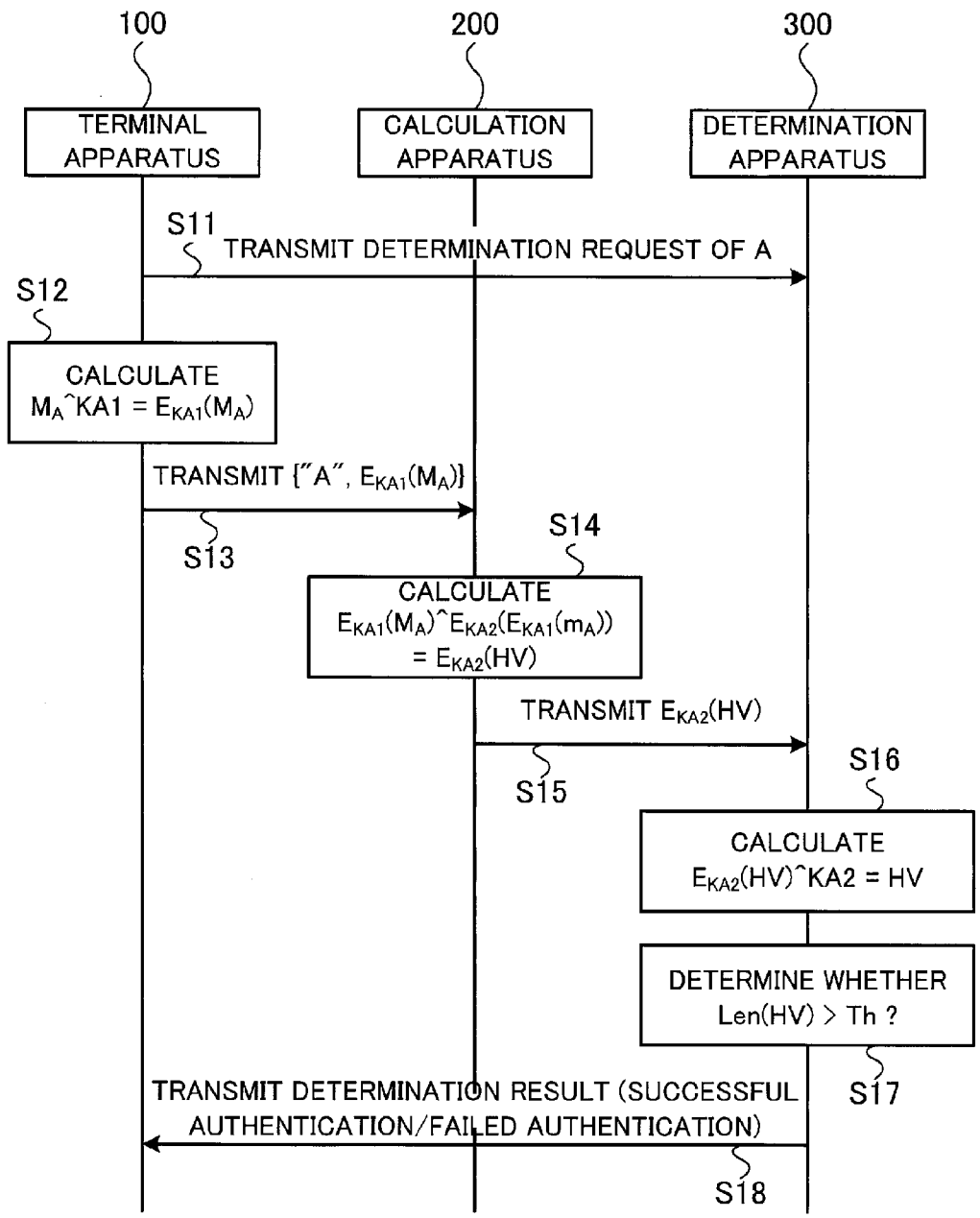
FIG. 3 illustrates an example of a verification process in the authentication system.

The following describes an example of a verification process in the authentication system with reference to FIG. 3. Note that FIG. 3 illustrates an example of a verification process in the authentication system.

As illustrated in FIG. 3, having received an input of the verification data $M_A$, the terminal apparatus 100 transmits a determination request of the verification data $M_A$ of the user A to the determination apparatus 300 (S11). Then, the terminal apparatus 100 calculates encrypted data $E_{KA1}(M_A)$, using the first encryption key KA1, as indicated in equation (3) below (S12). Then, the terminal apparatus 100 transmits, to the calculation apparatus 200, the encrypted data $E_{KA1}(M_A)$ together with the ID of the user A who entered the verification data $M_A$ (S13).

$$E_{KA1}(M_A)=M_A{}^\wedge KA1 \quad (3)$$

Having received the ID of the user A and the encrypted data $E_{KA1}(M_A)$, the calculation apparatus 200 extracts encrypted registration data $E_{KA2}(E_{KA1}(m_A))$ corresponding to the received ID. Then, the calculation apparatus 200 calculates encrypted distance data $E_{KA2}(HV)$ given by equation (4) below, using the encrypted registration data $E_{KA2}(E_{KA1}(m_A))$ and the encrypted data $E_{KA1}(M_A)$ (S14). Then, the calculation apparatus 200 transmits the encrypted distance data $E_{KA2}(HV)$ to the determination apparatus 300 (S15).

$$E_{KA2}(HV)=E_{KA1}(M_A){}^\wedge E_{KA2}(E_{KA1}(m_A)) \quad (4)$$

Having received the encrypted distance data $E_{KA2}(HV)$, the determination apparatus 300 calculates a Hamming vector MV, using the second encryption key KA2, as indicated in equation (5) below (S16). Then, the determination apparatus 300 compares a length Len(HV) of the Hamming vector HV with a predetermined threshold Th so as to determine whether Len(HV)>Th holds (S17).

For example, the length Len(HV) of the Hamming vector HV is the number of bits whose bit value in the HV is "1". If the HV is "00000101", Len(HV) is 2.

If Len(HV)>Th is determined to hold in step S17, the determination apparatus 300 transmits a determination result indicating a failure of authentication (failed authentication) to the terminal apparatus 100 (S18). On the other hand, if Len(HV)>Th is determined not to hold in step S17, the determination apparatus 300 transmits a determination result indicating a success of authentication (successful authentication) to the terminal apparatus 100 (S18). When the processing of step S18 is completed, the verification process of FIG. 3 ends.

$$HV=E_{KA2}(HV){}^\wedge KA2 \quad (5)$$

(Example of Registration Process)

Figure 4:
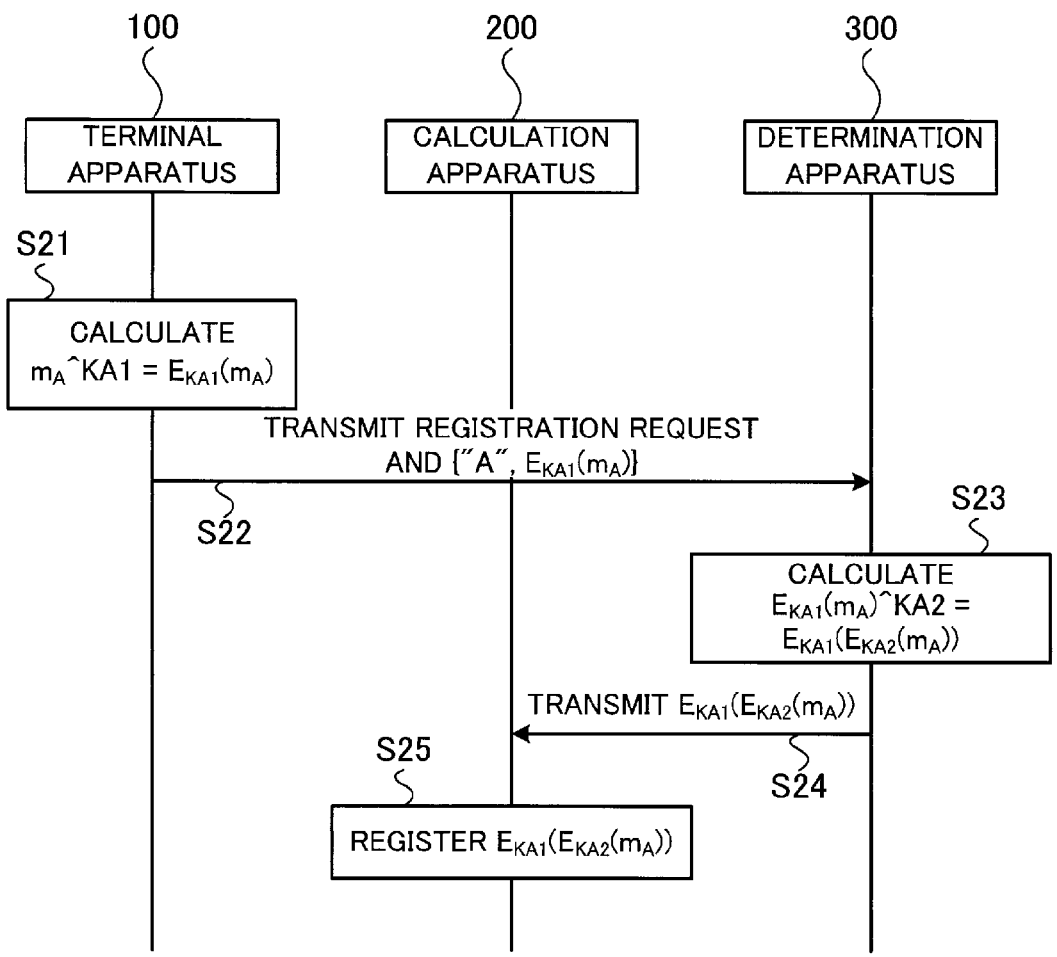
FIG. 4 illustrates an example of a registration process in the authentication system.

The following describes an example of a registration process in the authentication system with reference to FIG. 4. Note that FIG. 4 illustrates an example of a registration process in the authentication system.

As illustrated in FIG. 4, the terminal apparatus 100 having started a registration process calculates encrypted data $E_{KA1}(m_A)$ given by equation (6) below, using the first encryption key KA1 and the registration data $m_A$ (S21). Then, the terminal apparatus 100 transmits, to the determination apparatus 300, the ID of the user A and the encrypted data $E_{KA1}(m_A)$ together with a registration request (S22).

$$E_{KA1}(m_A)=m_A{}^\wedge KA1 \quad (6)$$

Having received the registration request, the ID, and the encrypted data $E_{KA1}(m_A)$, the determination apparatus 300 calculates encrypted registration data $E_{KA1}(E_{KA2}(m_A))$ given by equation (7) below, using the second key KA2 and the encrypted data $E_{KA1}(m_A)$ (S23). Then, the determination apparatus 300 transmits the encrypted registration data $E_{KA1}(E_{KA2}(m_A))$ calculated in step S23 to the calculation apparatus 200 (S24).

$$E_{KA1}(E_{KA2}(m_A))=E_{KA1}(m_A){}^\wedge KA2 \quad (7)$$

Having received the encrypted registration data $E_{KA1}(E_{KA2}(m_A))$, the calculation apparatus 200 registers the encrypted registration data $E_{KA1}(E_{KA2}(m_A))$ (S25). When the processing of step S25 is completed, the registration process of FIG. 4 ends.

(Unauthorized Registration by Determination Apparatus)

Figure 5:
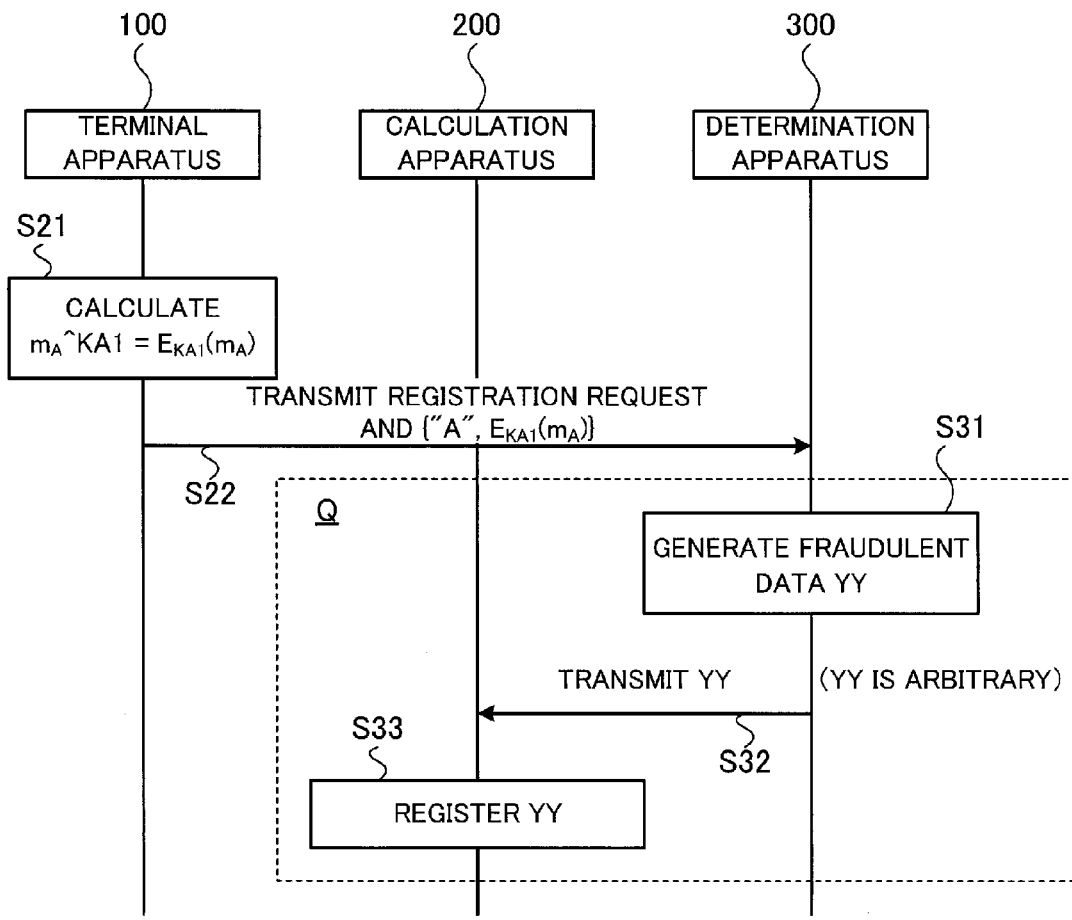
FIG. 5 illustrates an example of unauthorized registration by a determination apparatus included in the authentication system.

According to the authentication system of FIG. 2, it is possible to execute the registration process of FIG. 4. However, in the case where the mechanism of the registration process of FIG. 4 is applied, there might be a risk of unauthorized registration by the determination apparatus 300 illustrated in FIG. 5. FIG. 5 illustrates an example of unauthorized registration by the determination apparatus 300 included in the authentication system.

The processing of steps S21 and S22 of FIG. 5 is the same as the processing of steps S21 and S22 of FIG. 4. However, in the example of FIG. 5, as illustrated in the box denoted by a reference symbol Q, the determination apparatus 300 generates fraudulent data YY (S31), and transmits the fraudulent data YY to the calculation apparatus 200 (S32). The fraudulent data YY may be KA2, for example. In this case, the calculation apparatus 200 registers the above fraudulent data YY (S33).

In the case where the fraudulent data YY (YY=KA2) is registered in the calculation apparatus 200, the following unauthorized processing might be performed in the verification process.

For example, in the verification process illustrated in FIG. 3, when a malicious terminal apparatus 100 transmits binary data "00 . . . 0" whose bit values are all "0" as authentication object information in the processing of step S13, the calculation apparatus 200 performs an operation represented by equation (8) below. In this case, HV is binary data whose bit values are all "0". That is, Len(HV)=0. Accordingly, Len (HV)≤Th, so that the authentication succeeds.

$$(00 \ldots 0)\char`\^YY = E_{KA2}(00 \ldots 0) \qquad (8)$$

In the case where the mechanism of the registration process of FIG. 4 is applied, there might be a risk of unauthorized registration by the determination apparatus 300 illustrated in FIG. 5. There might also be a risk of attack by a third party. That is, instead of the determination apparatus 300 registering data, a third party might register the fraudulent data YY in the calculation apparatus 200, by interrupting the communication between the determination apparatus 300 and the calculation apparatus 200 and impersonating the determination apparatus 300. Accordingly, the second embodiment proposes a method that provides the authentication system with a mechanism of allowing the terminal apparatus 100 to directly register data in the calculation apparatus 200.

(Direct Registration by Terminal Apparatus)

Figure 6:
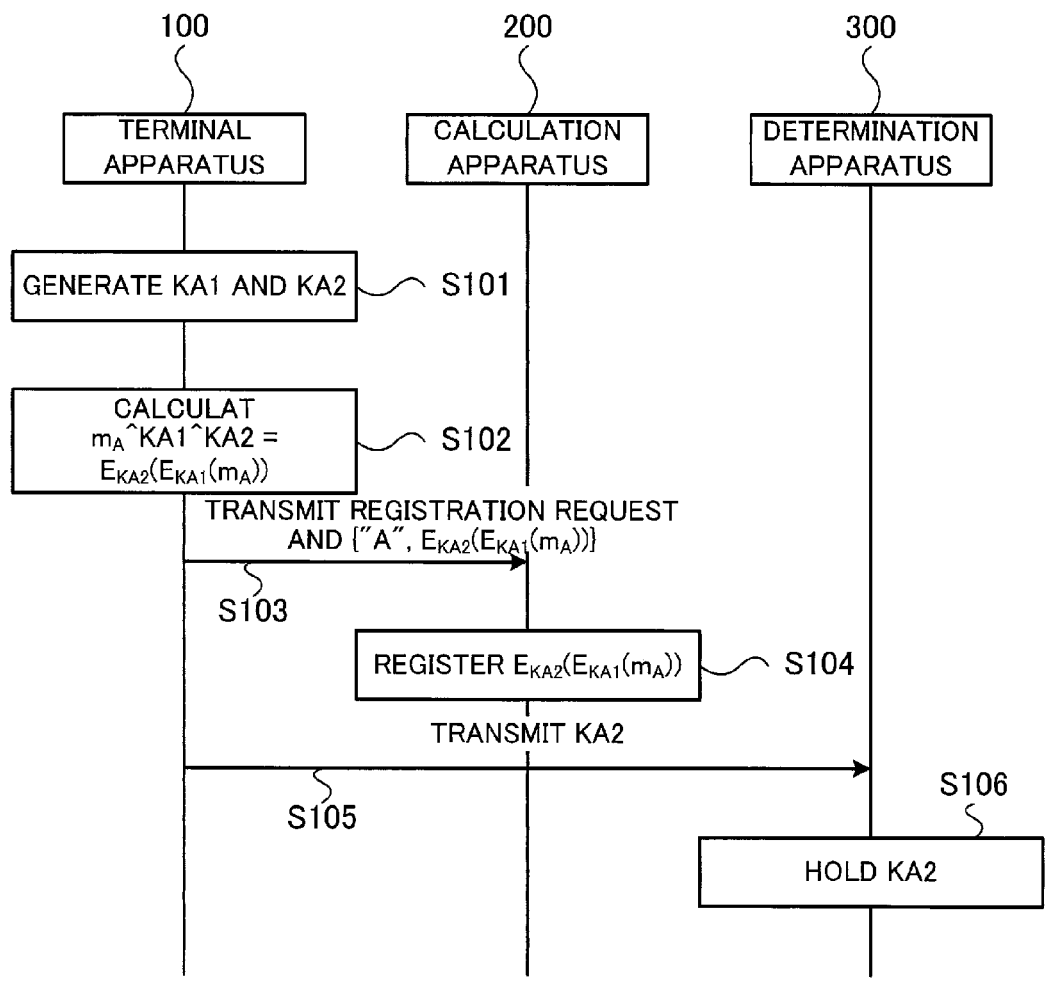
FIG. 6 illustrates an example of direct registration by a terminal apparatus according to the second embodiment.

The following describes a method of allowing the terminal apparatus 100 to directly register the encrypted registration data $E_{KA2}(E_{KA1}(m_A))$ in the calculation apparatus 200 with reference to FIG. 6. FIG. 6 illustrates an example of direct registration by the terminal apparatus 100 according to the second embodiment.

As illustrated in FIG. 6, the terminal apparatus 100 having started a registration process generates a first encryption key KA1 and a second encryption key KA2 (S101). Then, the terminal apparatus 100 calculates encrypted registration data $E_{KA2}(E_{KA1}(m_A))$ given by equation (9) below, using the registration data $m_A$, the first encryption key KA1, and the second encryption key KA2 (S102). Then, the terminal apparatus 100 transmits, to the calculation apparatus 200, the ID of the user A and the encrypted registration data $E_{KA2}(E_{KA1}(m_A))$ calculated in step S102, together with a registration request (S103).

$$E_{KA2}(E_{KA1}(m_A)) = m_A\char`\^KA1\char`\^KA2 \qquad (9)$$

Having received the encrypted registration data $E_{KA2}(E_{KA1}(m_A))$, the calculation apparatus 200 performs registration of the encrypted registration data $E_{KA2}(E_{KA1}(m_A))$ (S104). Further, the terminal apparatus 100 transmits the second encryption key KA2 generated in step S101 to the determination apparatus 300 (S105). Having received the second encryption key KA2, the determination apparatus 300 holds the received second encryption key KA2 (S106). When the processing of step S106 is completed, a series of processing steps illustrated in FIG. 6 ends. Note that the processing of steps S105 and S106 may be performed before step S102.

According to the above method, since the encrypted registration data $E_{KA2}(E_{KA1}(m_A))$ is directly transmitted from the terminal apparatus 100 to the calculation apparatus 200, the risk of unauthorized registration by the determination apparatus 300 is avoided. Further, since the second encryption key KA2 used for calculation of the encrypted registration data $E_{KA2}(E_{KA1}(m_A))$ is transmitted to the determination apparatus 300, it is possible to execute a verification process by the authentication system illustrated in FIG. 3.

The above is a description of the authentication system of the second embodiment. The following further describes each apparatus of the authentication system of the second embodiment.

(2-2) Hardware

Figure 7:
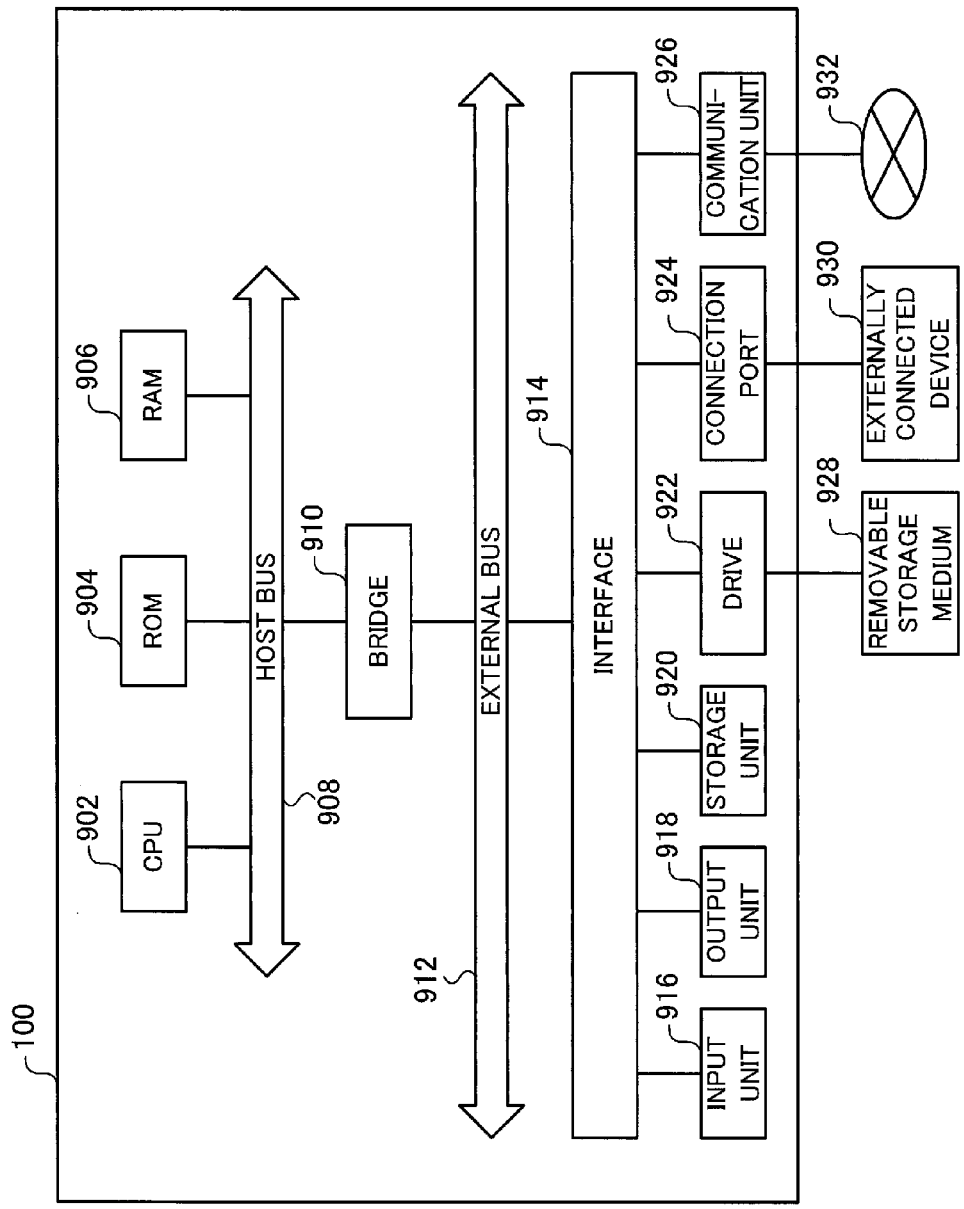
FIG. 7 illustrates an example of the hardware capable of realizing the functions of a cryptographic processing apparatus according to the second embodiment.

The hardware capable of realizing the functions of the terminal apparatus 100 will be described with reference to FIG. 7. FIG. 7 illustrates an example of the hardware capable of realizing the functions of a cryptographic processing apparatus according to the second embodiment.

The functions of the terminal apparatus 100 may be realized using the hardware resources of an information processing apparatus illustrated in FIG. 7, for example. That is, the functions of the terminal apparatus 100 are realized by controlling the hardware illustrated in FIG. 7, using a computer program.

As illustrated in FIG. 7, the hardware mainly includes a CPU 902, a read only memory (ROM) 904, a RAM 906, a host bus 908, and a bridge 910. The hardware further includes an external bus 912, an interface 914, an input unit 916, an output unit 918, a storage unit 920, a drive 922, a connection port 924, and a communication unit 926.

The CPU 902 functions as, for example, an arithmetic processing unit or a control device, and controls all or part of the operations of the components in accordance with various programs recorded in the ROM 904, the RAM 906, the storage unit 920, or a removable storage medium 928. The ROM 904 is an example of a storage device that stores programs to be read by the CPU 902, data used for computation, and the like. The RAM 906 temporarily or permanently stores, for example, a program to be read by the CPU 902, various parameters that change when the program is executed, and the like.

These components are connected to each other via the host bus 908 capable of high speed data transmission. The host bus 908 is connected to the external bus 912 having a relatively low data transmission speed via, for example, the bridge 910. The input unit 916 may be, for example, a mouse, a keyboard, a touch panel, a button, a switch, a lever, or the like. Further, the input unit 916 may be a remote controller capable of transmitting a control signal using infrared rays or other electronic waves.

The output unit 918 may be, for example, a display device such as a cathode ray tube (CRT), a liquid crystal display (LCD), a plasma display panel (PDP), an electro-luminescence display (ELD), and the like. Further, the output unit 918 may be an audio output device such as a speaker, a headphone, and the like, or may be a printer. That is, the output unit 918 is a device capable of visually or audibly outputting information.

The storage unit 920 is a device for storing various types of data. The storage unit 920 may be, for example, a magnetic storage device such as a hard disk drive (HDD) and the like. Further, the storage unit 920 may be a semiconductor storage device (such as a solid state drive (SSD), a RAM disk, and the like), an optical storage device, a magneto-optical storage device, or the like.

The drive 922 is a device that reads information recorded in the removable storage medium 928 as a detachable storage medium, or writes information to the removable storage medium 928. The removable storage medium 928 may be, for example, a magnetic disk, an optical disc, a magneto-optical disk, a semiconductor memory, or the like.

The connection port 924 is a port for connecting an externally connected device 930, such as a universal serial bus (USB) port, an IEEE1394 port, a small computer system interface (SCSI), an RS-232C port, an optical audio terminal, and the like. The externally connected device 930 may be a printer or the like, for example.

The communication unit 926 is a communication device for connection to a network 932. The communication unit 926 may be, for example, a communication circuit for a wired or wireless local area network (LAN), a communication circuit for a wireless USB (WUSB), a communication circuit and a router for optical communication, a communication circuit and a router for asymmetric digital subscriber line (ADSL), a communication circuit for a cellular phone network, or the like. The network 932 connected to the communication unit 926 is a network connected with a wire or wirelessly, and includes, for example, the Internet, a LAN, a broadcasting network, a satellite communication network, or the like.

The above is a description of the hardware capable of realizing the functions of the terminal apparatus 100. Note that it is possible to realize the functions of the calculation apparatus 200 and the determination apparatus 300 using the hardware illustrated in FIG. 6. Accordingly, a detailed description of the hardware capable of realizing the functions of the calculation apparatus 200 and the determination apparatus 300 is omitted.

(2-3) Functions of Apparatus

The following describes the functions of each apparatus included in the authentication system of the second embodiment.

(Functions of Terminal Apparatus)

Figure 8:
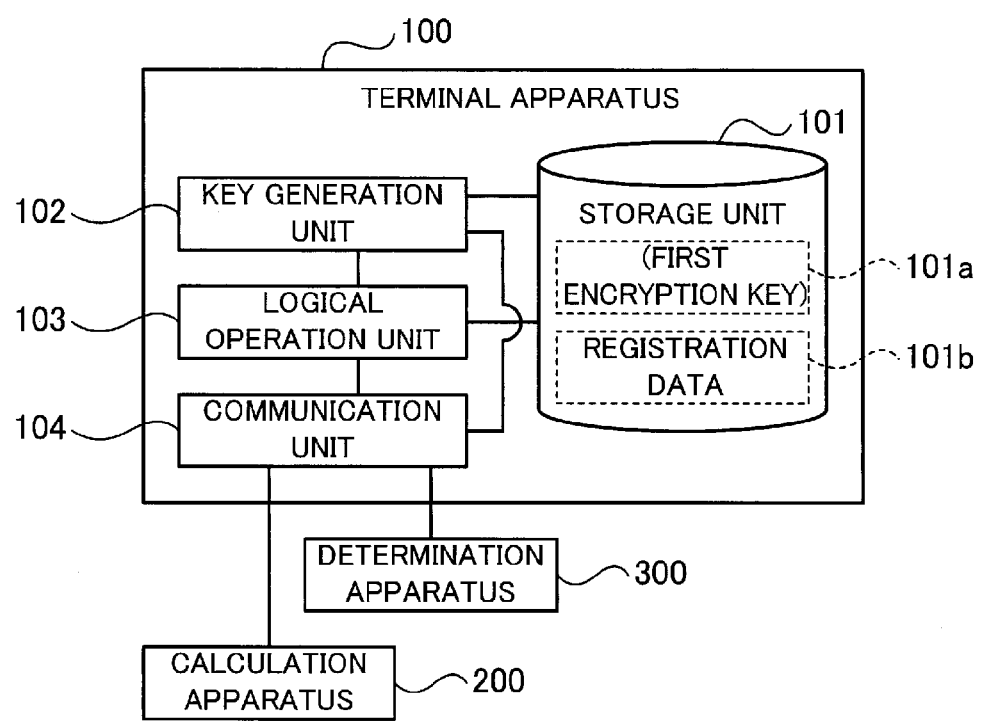
FIG. 8 is a block diagram illustrating an example of functions of the terminal apparatus according to the second embodiment.

The following describes the functions of the terminal apparatus 100 with reference to FIG. 8. FIG. 8 is a block diagram illustrating an example of functions of the terminal apparatus 100 according to the second embodiment.

As illustrated in FIG. 8, the terminal apparatus 100 includes a storage unit 101, a key generation unit 102, a logical operation unit 103, and a communication unit 104.

Note that the functions of the storage unit 101 may be realized using the RAM 906, the storage unit 920, and so on described above. Further, the functions of the key generation unit 102 and the logical operation unit 103 may be realized using the CPU 902 and so on described above. Further, the functions of the communication unit 104 may be realized using the connection port 924, the communication unit 926, and so on described above.

The storage unit 101 stores a first encryption key 101a and registration data 101b. Note that the above-described first encryption keys KA1, KB1, and so on are examples of the first encryption key 101a. Further, the registration data $m_A$, the registration data $m_B$, and so on are examples of the registration data 101b. For purposes of simplicity, the following description focuses on the first encryption key KA1 and the registration data $m_A$.

When performing registration of the registration data $m_A$, the key generation unit 102 generates the first encryption key KA1 and the second encryption key KA2. The first encryption key KA1 and the second encryption key KA2 generated by the key generation unit 102 are input to the logical operation unit 103. Further, the first encryption key KA1 is stored in the storage unit 101, and the second encryption key KA2 is input to the communication unit 104.

Having received the input of the first encryption key KA1 and the second encryption key KA2, the logical operation unit 103 reads the registration data $m_A$ from the storage unit 101. Further, the logical operation unit 103 performs an exclusive-OR operation of the registration data $m_A$, the first encryption key KA1 and the second encryption key KA2 so as to generate encrypted registration data $E_{KA2}(E_{KA1}(m_A))$, as indicated in equation (10) below. The encrypted registration data $E_{KA2}(E_{KA1}(m_A))$ generated by the logical operation unit 103 is input to the communication unit 104.

$$E_{KA2}(E_{KA1}(m_A)) = m_A \char`\^ KA1 \char`\^ KA2 \quad (10)$$

The communication unit 104 transmits the second encryption key KA2 generated by the key generation unit 102 to the determination apparatus 300. Further, the communication unit 104 transmits the encrypted registration data $E_{KA2}(E_{KA1}(m_A))$ generated by the logical operation unit 103 to the calculation apparatus 200. While registration of the registration data $m_A$ has been described, registration of other registration data me and so on is performed in the same manner. Further, the storage unit 101, the logical operation unit 103, and the communication unit 104 are used also in the verification process.

(Functions of Calculation Apparatus)

Figure 9:
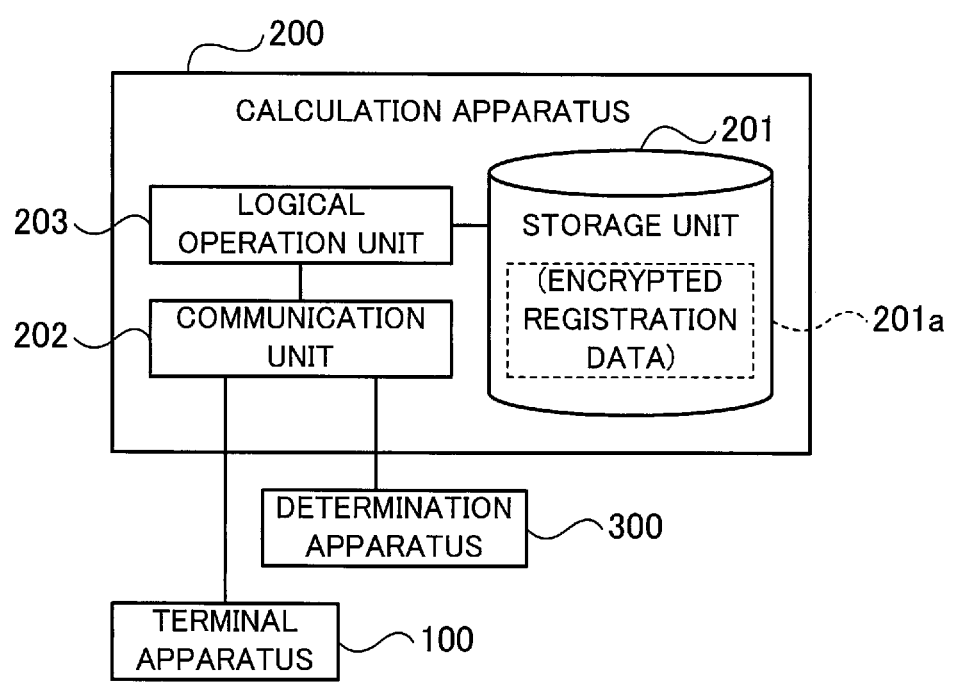
FIG. 9 is a block diagram illustrating an example of functions of a calculation apparatus according to the second embodiment.

The following describes the functions of the calculation apparatus 200 with reference to FIGS. 9 and 10. FIG. 9 is a block diagram illustrating an example of functions of the calculation apparatus 200 according to the second embodiment. FIG. 10 illustrates an example of encrypted registration data according to the second embodiment.

As illustrated in FIG. 9, the calculation apparatus 200 includes a storage unit 201, a communication unit 202, and a logical operation unit 203.

Note that the functions of the storage unit 201 may be realized using the RAM 906, the storage unit 920, and so on described above. Further, the functions of the communication unit 202 may be realized using the connection port 924, the communication unit 926, and so on described above. Further, the functions of the logical operation unit 203 may be realized using the CPU 902 and so on described above.

The storage unit 201 stores encrypted registration data 201a. For example, as illustrated in FIG. 10, the encrypted registration data 201a is managed by a database in which the ID of the user and the encrypted registration data 201a are associated with each other. In the example of FIG. 10, the ID of the user A and the encrypted registration data $E_{KA2}(E_{KA1}(m_A))$ are associated with each other, and the ID of the user B and the encrypted registration data $E_{KA2}(E_{KB1}(m_B))$ are associated with each other.

For example, the communication unit 202 receives the ID of the user A and the encrypted registration data $E_{KA2}(E_{KA1}(m_A))$ from the terminal apparatus 100. Then, the communication unit 202 stores the ID of the user A and the encrypted registration data $E_{KA2}(E_{KA1}(m_A))$ in association with each other in the storage unit 201. Thus, the processing by the calculation apparatus 200 for registration of the registration data $m_A$ is completed. While registration of the encrypted registration data $E_{KA2}(E_{KA1}(m_A))$ has been described, registration of other encrypted registration data $E_{KB2}(E_{KB1}(m_B))$ and so on is performed in the same manner.

Note that the logical operation unit 203 is used in the verification process. For example, when the communication unit 202 receives the encrypted data $E_{KA1}(M_A)$ from the terminal apparatus 100, the logical operation unit 203 performs an exclusive-OR operation (see the above equation (4)) of the encrypted registration data $E_{KA2}(E_{KA1}(m_A))$ registered in the storage unit 201 and the encrypted data $E_{KA1}(M_A)$ so as to calculate the encrypted distance data $E_{KA2}(HV)$. Then, the logical operation unit 203 transmits encrypted distance data $E_{KA2}(HV)$ to the determination apparatus 300 through the communication unit 202.

(Functions of Determination Apparatus)

Figure 11:
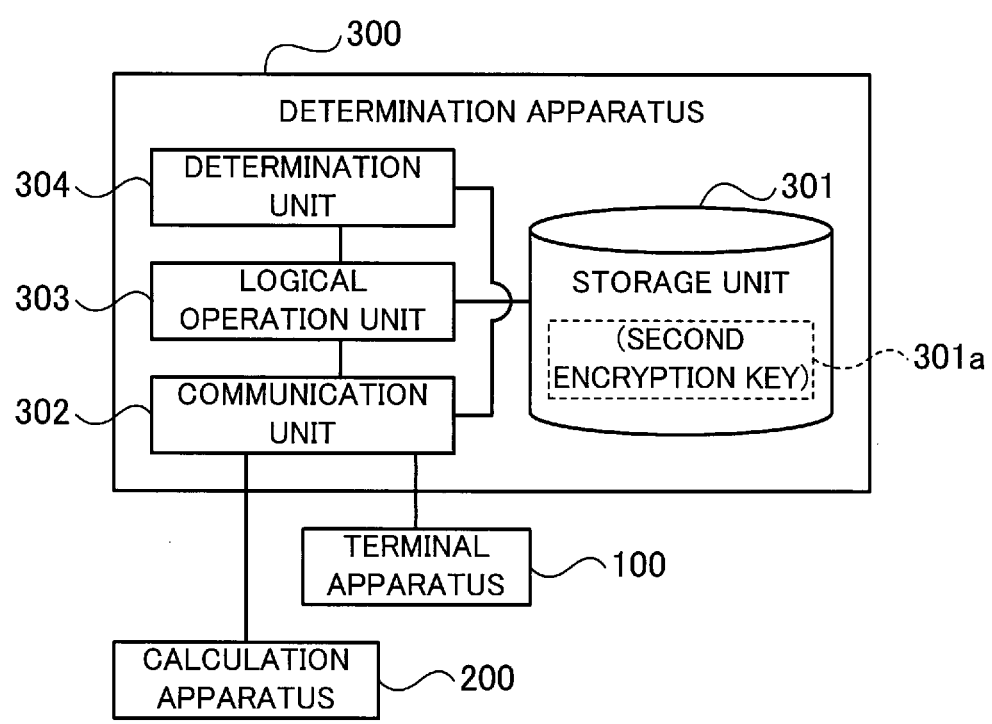
FIG. 11 is a block diagram illustrating an example of functions of the determination apparatus according to the second embodiment.

The following describes the functions of the determination apparatus 300 with reference to FIG. 11. FIG. 11 is a block diagram illustrating an example of functions of the determination apparatus 300 according to the second embodiment.

As illustrated in FIG. 11, the determination apparatus 300 includes a storage unit 301, a communication unit 302, a logical operation unit 303, and a determination unit 304.

Note that the functions of the storage unit 301 may be realized using the RAM 906, the storage unit 920, and so on described above. The functions of the communication unit 302 may be realized using the connection port 924, the communication unit 926, and so on described above. The functions of the logical operation unit 303 and the determination unit 304 may be realized using the CPU 902 and so on described above.

The storage unit 301 stores a second encryption key 301a. Note that the above-described second encryption keys KA2, KB2, and so on are examples of the second encryption key 301a.

When performing registration of the registration data $m_A$, the communication unit 302 receives the second encryption key KA2 from the terminal apparatus 100. Then, the communication unit 302 stores the second encryption key KA2 in the storage unit 301. Thus, the processing by the determination apparatus 300 for registration of the registration data $m_A$ is completed. While registration of the registration data $m_A$ has been described, registration of other registration data me and so on is performed in the same manner.

Note that the logical operation unit 303 and the determination unit 304 are used in the verification process. For example, when the communication unit 302 receives a determination request of the verification data $M_A$ to be verified against the registration data $m_A$, the communication unit 302 inputs the ID of the user A to the logical operation unit 303. After that, when the communication unit 302 receives the encrypted distance data $E_{KA2}$(HV) from the calculation apparatus 200, the logical operation unit 303 performs an exclusive-OR operation (see the above equation (5)) of the encrypted distance data $E_{KA2}$(HV) and the second encryption key KA2 so as to calculate the Hamming vector HV (HV=$m_A\hat{\ }M_A$).

The Hamming vector HV calculated by the logical operation unit 303 is input to the determination unit 304. Having received the input of the Hamming vector HV, the determination unit 304 calculates a Len(HV) of the Hamming vector HV, and compares the Len(HV) with the predetermined threshold Th. If Len(HV)>Th holds, the determination unit 304 transmits a determination result indicating a failure of authentication (failed authentication) to the terminal apparatus 100 through the communication unit 302. If Len(HV)>Th does not hold, the determination unit 304 transmits a determination result indicating a success of authentication (successful authentication) to the terminal apparatus 100 through the communication unit 302.

The above is a description of the functions of each apparatus included in the authentication system of the second embodiment.

As described above, in the authentication system of the second embodiment, the terminal apparatus 100 directly registers the encrypted registration data $E_{KA2}(E_{KA1}(m_A))$ in the calculation apparatus 200. Therefore, upon registration, it is possible to reduce the risk of fraudulent data being registered in the calculation apparatus 200 by the determination apparatus 300 without being noticed by the terminal apparatus 100.

(2-4) Use of Key Generation Function

Figure 12:
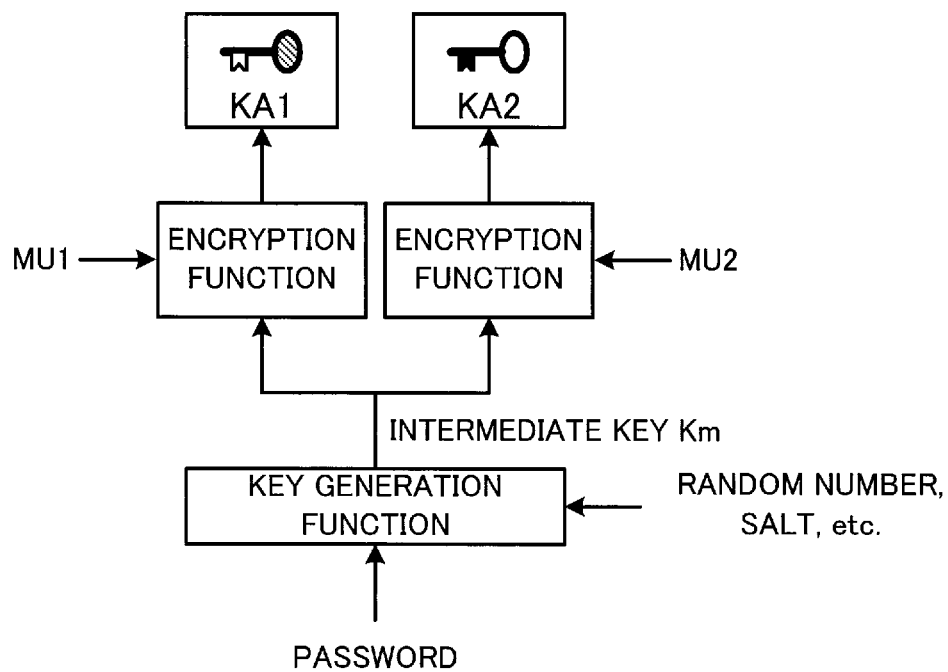
FIG. 12 illustrates use of a key generation function according to the second embodiment.

The following describes use of a key generation function with reference to FIG. 12. FIG. 12 illustrates use of a key generation function according to the second embodiment.

In the above, a mechanism has been described in which the terminal apparatus 100 generates the first encryption key KA1 and the second encryption key KA2 and the terminal apparatus 100 directly registers the encrypted registration data $E_{KA2}(E_{KA1}(m_A))$ in the calculation apparatus 200.

In the case where the above mechanism is applied, if the first encryption key KA1 and the second encryption key KA2 are leaked from the terminal apparatus 100, there arises a risk of the registration data $m_A$ being leaked from the encrypted registration data $E_{KA2}(E_{KA1}(m_A))$ held by the calculation apparatus 200. Accordingly, a mechanism for the terminal apparatus 100 to safely manage the first encryption key KA1 and the second encryption key KA2 is provided.

One example of such a mechanism may be a method that, after registration, stores the first encryption key KA1 in an integrated circuit (IC) card with tamper resistance, and deletes the first encryption key KA1 and the second encryption key KA2 from the terminal apparatus 100. Thus, each time a verification process is executed, the first encryption key KA1 is read from the IC card. Another example may be a method that generates a pair of the first encryption key KA1 and the second generation key KA2 from a password, using a key generation function and an encryption function, as illustrated in FIG. 12.

The key generation function may be, for example, a password-based key derivation function (PBKDF) defined by the Public Key Cryptography Standards (PKCS) #5 or the like. When a password, a random number, a salt, parameters (iteration count and the bit length of the encryption key) and the like are input to the PBKDF, an encryption key is output. In the example of FIG. 12, an intermediate key Km is output from a key generation function.

The intermediate key Km output from the key generation function is input to two encryption functions. The encryption functions may be, for example, a hash function, other one-way functions, or the like. A fixed value MU1 is input to one of the encryption functions, and a fixed value MU2 (MU1≠MU2) is input to the other one of the encryption functions. The two fixed values MU1 and MU2 are set for each user.

The terminal apparatus 100 (key generation unit 102) uses an output of one of the encryption functions as the first encryption key KA1, and an output of the other one of the encryption functions as the second encryption key KA2. Thus, using a key generation function reduces the risk of the first encryption key KA1 and the second encryption key KA2 from being leaked from the terminal apparatus 100. Further, the cost is reduced compared to the case where an IC card is used.

The above is a description of use of a key generation function.

(2-5) Operations of Apparatus

The following describes the operations of each apparatus included in the authentication system of the second embodiment. Note that the following describes operations for registration of the registration data $m_A$.

(Operations of Terminal Apparatus)

Figure 13:
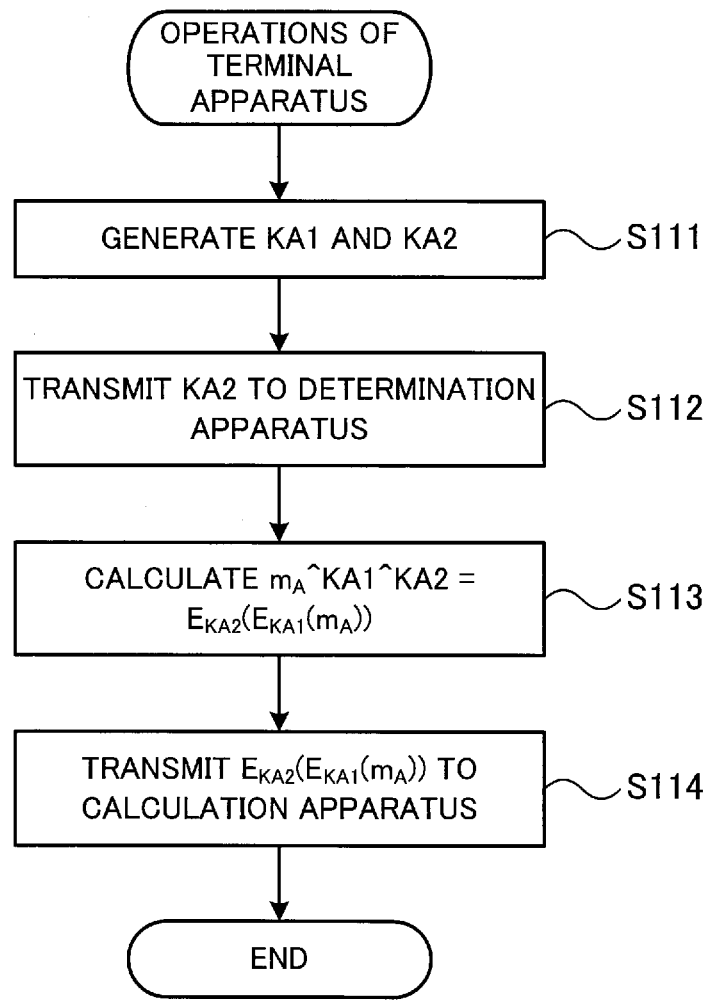
FIG. 13 is a flowchart illustrating exemplary operations of the terminal apparatus according to the second embodiment.

First, the operations of the terminal apparatus 100 will be described with reference to FIG. 13. FIG. 13 is a flowchart illustrating exemplary operations of the terminal apparatus 100 according to the second embodiment.

As illustrated in FIG. 13, the terminal apparatus 100 having started a registration process of the registration data $m_A$ of the user A causes the key generation unit 102 to generate a first encryption key KA1 and a second encryption key KA2 (S111). Then, the terminal apparatus 100 causes the communication unit 104 to transmit the second encryption key KA2 generated in step S111 to the determination apparatus 300 (S112). Note that the processing of step S112 may be executed after the processing of step S113 or S114 described below.

Then, the terminal apparatus 100 causes the logical operation unit 103 to perform an exclusive-OR operation (see the above equation (9)) of the registration data $m_A$, the first encryption key KA1, and the second encryption key KA2 so as to calculate encrypted registration data $E_{KA2}(E_{KA1}(m_A))$ (S113). Then, the terminal apparatus 100 causes the communication unit 104 to transmit, to the calculation apparatus 200, the encrypted registration data $E_{KA2}(E_{KA1}(m_A))$ calculated in step S113, together with the ID of the user A (S114). When the processing of step S114 is completed, a series of processing steps illustrated in FIG. 13 ends.

(Operations of Determination Apparatus)

Figure 14:
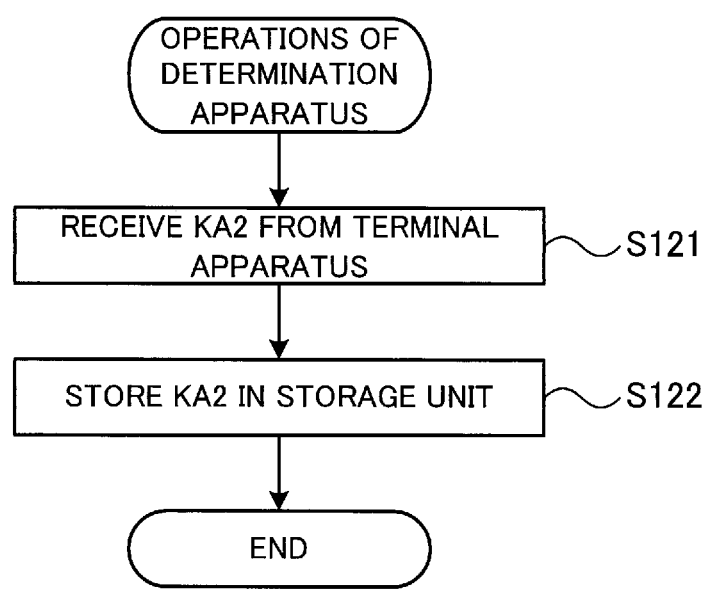
FIG. 14 is a flowchart illustrating exemplary operations of the determination apparatus according to the second embodiment.

Next, the operations of the determination apparatus 300 will be described with reference to FIG. 14. FIG. 14 is a flowchart illustrating exemplary operations of the determination apparatus 300 according to the second embodiment.

As illustrated in FIG. 14, the determination apparatus 300 receives the second encryption key KA2 from the terminal apparatus 100 through the communication unit 302 (S121). Then, the determination apparatus 300 causes the communication unit 302 to store the second encryption key KA2 received in step S121 in the storage unit 301 (S122). When the processing of step S122 is completed, a series of processing steps illustrated in FIG. 14 ends.

(Operations of Calculation Apparatus)

Figure 15:
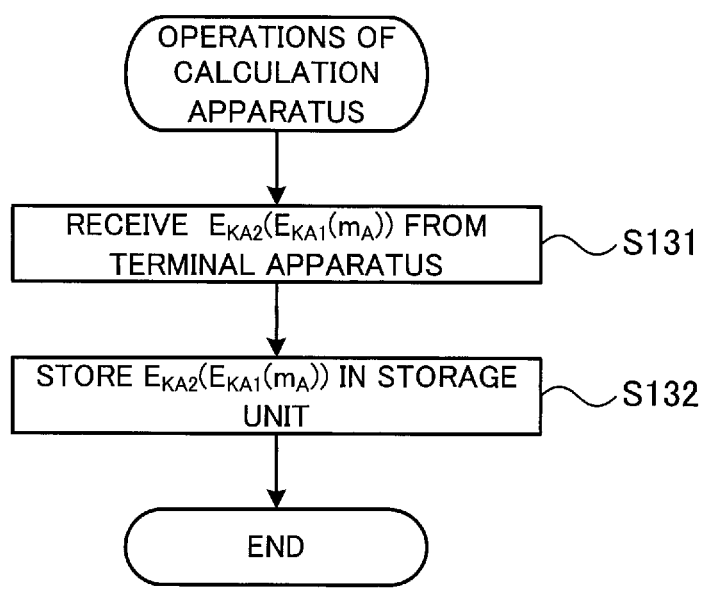
FIG. 15 is a flowchart illustrating exemplary operations of the calculation apparatus according to the second embodiment.

Next, the operations of the calculation apparatus 200 will be described with reference to FIG. 15. FIG. 15 is a flowchart illustrating exemplary operations of the calculation apparatus 200 according to the second embodiment.

As illustrated in FIG. 15, the calculation apparatus 200 receives the encrypted registration data $E_{KA2}(E_{KA1}(m_A))$ from the terminal apparatus 100 through the communication unit 202 (S131). Then, the calculation apparatus 200 stores the encrypted registration data $E_{KA2}(E_{KA1}(m_A))$ received in step S131 in the storage unit 201 (S132). When the processing of step S132 is completed, a series of processing steps illustrated in FIG. 15 ends.

The above is a description of the operations of each apparatus included in the authentication system of the second embodiment.

As described above, the terminal apparatus 100 directly registers the encrypted registration data $E_{KA2}(E_{KA1}(m_A))$ in the calculation apparatus 200. Thus, it is possible to reduce the risk of fraudulent data being registered in the calculation apparatus 200 by the determination apparatus 300.

The above is a description of the second embodiment.

(3) Modification (Use of Temporary Key)

The following describes a modification (hereinafter referred to as the "present modification") of the second embodiment. The present modification relates to a method that allows the terminal apparatus 100 to directly register encrypted data of the registration data $m_A$ in the calculation apparatus 200 in a situation where the determination apparatus 300 holds the second encryption key KA2 in advance and the terminal apparatus 100 does not hold the second encryption key KA2.

(Method Using Temporary Key for Preventing Unauthorized Registration)

Figure 16:
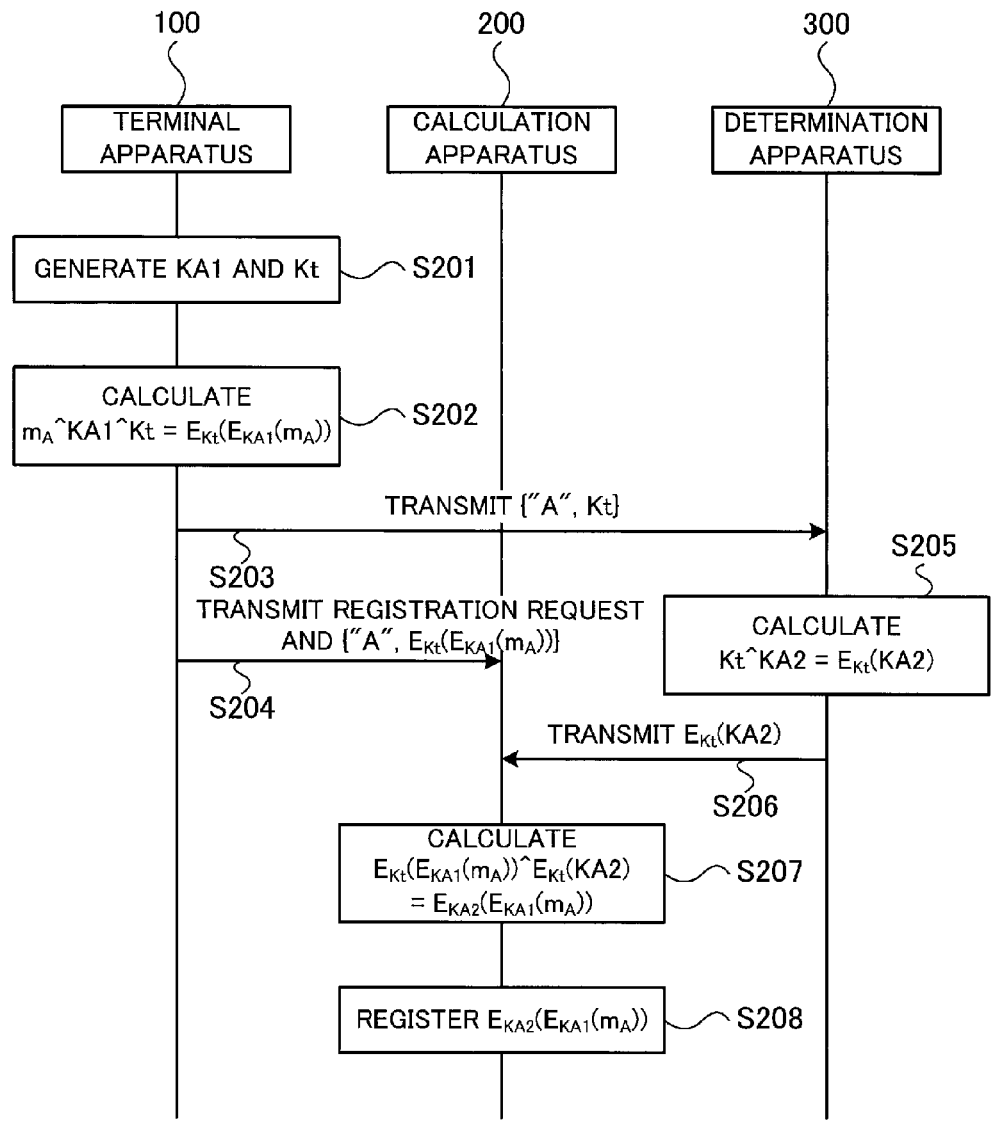
FIG. 16 illustrates an example of direct registration by the terminal apparatus according to a modification of the second embodiment.

The above method according to the present modification will be described with reference to FIG. 16. FIG. 16 illustrates an example of direct registration by the terminal apparatus 100 according to the present modification of the second embodiment. This method uses a temporary key Kt that is updated each time registration is performed.

As illustrated in FIG. 16, the terminal apparatus 100 having started a registration process of the registration data $m_A$ generates a first encryption key KA1 and a temporary key Kt (S201). Then, the terminal apparatus 100 performs an exclusive-OR operation of the registration data $m_A$, the first encryption key KA1, and the temporary key Kt so as to calculate encrypted data $E_{Kt}(E_{KA1}(m_A))$ given by equation (11) below (S202).

$$E_{Kt}(E_{KA1}(m_A))=m_A\char`\^KA1\char`\^Kt \qquad (11)$$

Then, the terminal apparatus 100 transmits, to the determination apparatus 300, the temporary key Kt together with the ID of the user A (S203). Further, the terminal apparatus 100 transmits, to the calculation apparatus 200, the ID of the user A and the encrypted data $E_{Kt}(E_{KA1}(m_A))$ calculated in step S202, together with a registration request (S204). Note that steps S203 and S204 may be performed in reverse order.

Having received the ID and the temporary key Kt, the determination apparatus 300 performs an exclusive-OR operation of the temporary key Kt and the second encryption key KA2 so as to calculate encrypted key data $E_{Kt}(KA2)$, as indicated in equation (12) below (S205). Then, the determination apparatus 300 transmits the encrypted key data $E_{Kt}(KA2)$ calculated in step S205 to the calculation apparatus 200 (S206).

$$E_{Kt}(KA2)=Kt\char`\^KA2 \qquad (12)$$

Having received the registration request, the ID, the encrypted data $E_{Kt}(E_{KA1}(m_A))$, and the encrypted key data $E_{Kt}(KA2)$, the calculation apparatus 200 performs an exclusive-OR operation represented by equation (13) below so as to calculate encrypted registration data $E_{KA2}(E_{KA1}(m_A))$ (S207). That is, in the processing of step S207, the calculation apparatus 200 performs an exclusive-OR operation of the encrypted data $E_{Kt}(E_{KA1}(m_A))$ and the encrypted key data $E_{Kt}(KA2)$.

$$E_{KA2}(E_{KA1}(m_A))=E_{Kt}(E_{KA1}(m_A))\char`\^E_{Kt}(KA2) \qquad (13)$$

Then, the calculation apparatus 200 stores the encrypted registration data $E_{KA2}(E_{KA1}(m_A))$ in the storage unit 101, and registers the encrypted registration data $E_{KA2}(E_{KA1}(m_A))$ (S208). When the processing of step S208 is completed, a series of processing steps illustrated in FIG. 16 ends.

As described above, using the temporary key Kt allows the terminal apparatus 100 to directly transmit the encrypted data of the registration data $m_A$ to the calculation apparatus 200 even if the determination apparatus 300 holds the second encryption key KA2 in advance. As a result, it is possible to reduce the risk of fraudulent data being registered in the calculation apparatus 200 by the determination apparatus 300.

(3-1) Functions of Apparatus

The following describes the functions of the terminal apparatus 100, the calculation apparatus 200, and the determination apparatus 300 according to the present modification. Note that the following describes functions modified from those of FIGS. 8, 9, and 11, and a detailed description of the common functions will be omitted.

(Functions of Terminal Apparatus)

As for the terminal apparatus 100, modifications are made mainly to the functions of the key generation unit 102 and the logical operation unit 103. The key generation unit 102 of the present modification generates a first encryption key KA1 and a temporary key Kt. Further, the logical operation unit 103 of the present embodiment calculates encrypted data $E_{Kt}(E_{KA1}(m_A))$ in accordance with the above equation (11). Then, the communication unit 104 transmits the temporary key Kt to the determination apparatus 300 instead of the second encryption key KA2, and transmits the encrypted data $E_{Kt}(E_{KA1}(m_A))$ to the calculation apparatus 200 instead of the encrypted registration data $E_{KA2}(E_{KA1}(m_A))$.

(Functions of Calculation Apparatus)

As for the calculation apparatus 200, modifications are made mainly to the functions of the logical operation unit 203. The logical operation unit 203 according to the present modification calculates encrypted registration data $E_{KA2}(E_{KA1}(m_A))$ in accordance with the above equation (13), based on the encrypted data $E_{Kt}(E_{KA1}(m_A))$ received from the terminal apparatus 100 and the encrypted key data $E_{Kt}(KA2)$ received from the determination apparatus 300.

(Functions of Determination Apparatus)

As for the determination apparatus 300, modifications are made mainly to the functions of the logical operation unit 303. Further, the second encryption key KA2 is stored in advance in the storage unit 301. The logical operation unit 303 according to the present modification calculates encrypted key data $E_{Kt}(KA2)$ in accordance with the above equation (12), based on the temporary key Kt received from the terminal apparatus 100. Then, the communication unit 302 transmits the encrypted key data $E_{Kt}(KA2)$ to the calculation apparatus 200.

The above is a description of the functions of the terminal apparatus 100, the calculation apparatus 200, and the determination apparatus 300 according to the present modification. As described above, the first encryption key KA1 is managed by the terminal apparatus 100 and the second encryption key KA2 is managed by the determination apparatus 300. This reduces the risk of both the first encryption key KA1 and the second encryption key KA2 being leaked and the registration data $m_A$ being stolen.

(3-2) Operations of Apparatus

The following describes the operations of each apparatus included in the authentication system according to the present modification. Note that the following describes the operations for registration of the registration data $m_A$.

(Operations of Terminal Apparatus)

Figure 17:
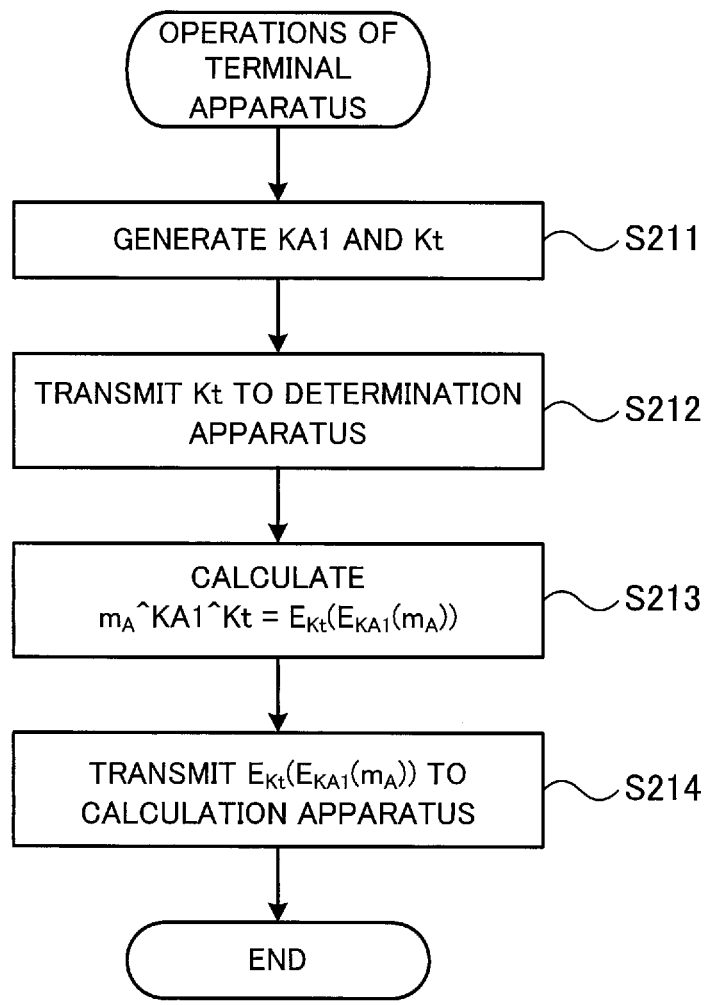
FIG. 17 is a flowchart illustrating exemplary operations of the terminal apparatus according to the modification of the second embodiment.

First, the operations of the terminal apparatus 100 according to the present modification will be described with reference to FIG. 17. FIG. 17 is a flowchart illustrating exemplary operations of the terminal apparatus 100 according to the modification of the second embodiment.

As illustrated in FIG. 17, the terminal apparatus 100 causes the key generation unit 102 to generate a first encryption key KA1 and a temporary key Kt (S211). Note that the first encryption key KA1 and the temporary key Kt may be generated using the key generation functions illustrated in FIG. 12. Then, the terminal apparatus 100 causes the communication unit 104 to transmit the temporary key Kt generated in step S211 to the determination apparatus 300 (S212).

Then, the terminal apparatus 100 causes the logical operation unit 103 to perform an exclusive-OR operation (see the above equation (11)) of the registration data $m_A$, the first encryption key KA1, and the temporary key Kt so as to calculate encrypted data $E_{Kt}(E_{KA1}(m_A))$ (S213). Then, the terminal apparatus 100 causes the communication unit 104 to transmit, to the calculation apparatus 200, the encrypted data $E_{Kt}(E_{KA1}(m_A))$ calculated in step S213, together with the ID of the user A (S214). When the processing of step S214 is completed, a series of processing steps illustrated in FIG. 17 ends.

(Operations of Determination Apparatus)

Figure 18:
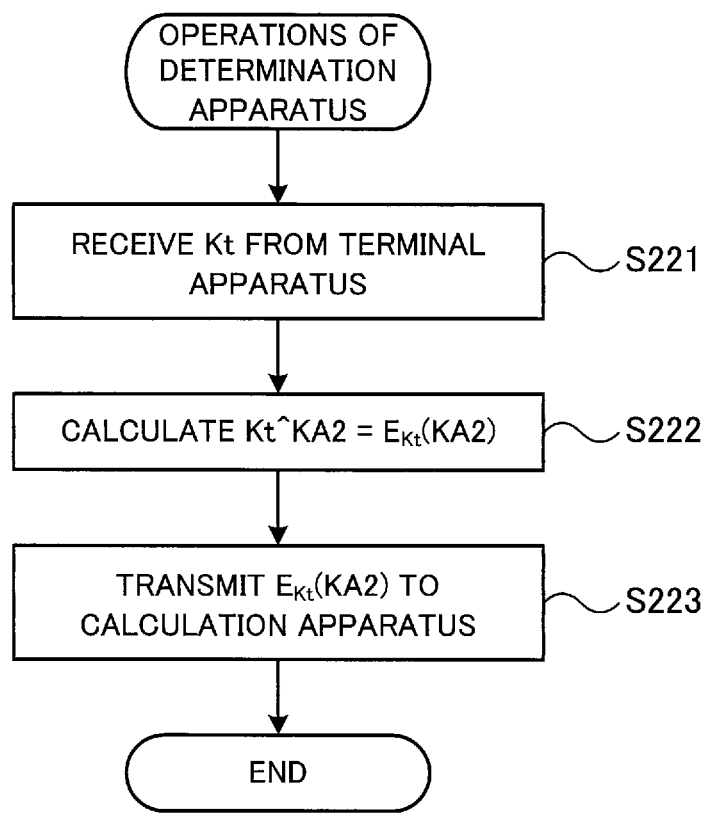
FIG. 18 is a flowchart illustrating exemplary operations of the determination apparatus according to the modification of the second embodiment.

The following describes the operations of the determination apparatus 300 according to the present modification with reference to FIG. 18. FIG. 18 is a flowchart illustrating exemplary operations of the determination apparatus 300 according to the modification of the second embodiment.

As illustrated in FIG. 18, the determination apparatus 300 receives the temporary key Kt from the terminal apparatus 100 through the communication unit 302 (S221). Then, the determination apparatus 300 causes the logical operation unit 303 to perform an exclusive-OR operation (see the above equation (12)) of the temporary key Kt and the second encryption key KA2 so as to calculate encrypted key data $E_{Kt}(KA2)$ (S222).

Then, the determination apparatus 300 causes the communication unit 302 to transmit the encrypted key data $E_{Kt}(KA2)$ calculated in step S222 to the calculation apparatus 200 (S223). When the processing of step S223 is completed, a series of processing steps illustrated in FIG. 18 ends.

(Operations of Calculation Apparatus)

Figure 19:
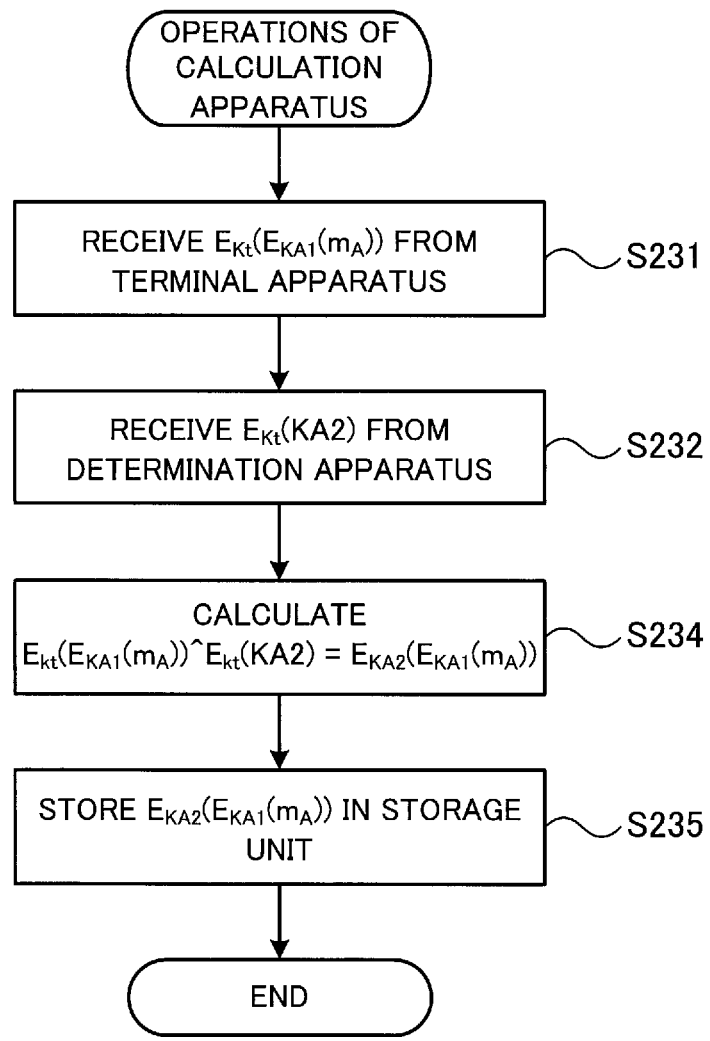
FIG. 19 is a flowchart illustrating exemplary operations of the calculation apparatus according to the modification of the second embodiment.

The following describes the operations of the calculation apparatus 200 according to the present modification with reference to FIG. 19. FIG. 19 is a flowchart illustrating exemplary operations of the calculation apparatus 200 according to the modification of the second embodiment.

As illustrated in FIG. 19, the calculation apparatus 200 receives the encrypted data $E_{Kt}(E_{KA1}(m_A))$ from the terminal apparatus 100 through the communication unit 202 (S231). Then, the calculation apparatus 200 receives the encrypted key data $E_{Kt}(KA2)$ from the determination apparatus 300 through the communication unit 202 (S232).

Then, the calculation apparatus 200 causes the logical operation unit 203 to calculate encrypted registration data $E_{KA2}(E_{KA1}(m_A))$, using the encrypted data $E_{Kt}(E_{KA1}(m_A))$ received in step S231 and the encrypted key data $E_{KA2}(KA2)$ received in step S232 (S234). In the processing of step S234, the encrypted registration data $E_{KA2}(E_{KA1}(m_A))$ is calculated in accordance with, for example, the above equation (13).

Then, the calculation apparatus 200 causes the logical operation unit 203 to store the encrypted registration data $E_{KA2}(E_{KA1}(m_A))$ in the storage unit 201 (S235). When the processing of step S235 is completed, a series of processing steps illustrated in FIG. 19 ends.

The above is a description of the operations of each apparatus included in the authentication system of the present modification.

As described above, the terminal apparatus 100 directly transmits the encrypted data $E_{Kt}(E_{KA1}(m_A))$ related to the encrypted registration data $E_{KA2}(E_{KA1}(m_A))$ to the calculation apparatus 200. Thus, it is possible to reduce the risk of fraudulent data being registered in the calculation apparatus 200 by the determination apparatus 300. Further, the first encryption key KA1 is managed by the terminal apparatus 100 and the second encryption key KA2 is managed by the determination apparatus 300. This reduces the risk of both the first encryption key KA1 and the second encryption key KA2 being leaked and the registration data $m_A$ being stolen.

The above is a description of a modification of the second embodiment.

According to the present invention, it is possible to prevent unauthorized registration by a determination apparatus.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program that causes a computer having a memory and a processor, to perform a process comprising:
   acquiring, by the processor, a first key and a second key different from the first key, from the memory;
   generating, by the processor, first encrypted data by making a logical calculation between data for authentication and the first key, and generating second encrypted data by making the logical calculation between the first encrypted data and the second key;
   transmitting, by the processor, the second encrypted data to a calculation apparatus which manages third encrypted data as registered data, the third encrypted data being generated by making the logical calculation between the first encrypted data and a third key; and
   transmitting, by the processor, the second key to a determination apparatus which maintains the third key, generates encrypted key data by making the logical calculation between a key received from the computer and the third key, and transmits the encrypted key data to the calculation apparatus;
   receiving, by the processor, an authentication result from the determination apparatus, wherein the authentication result is based on the data for authentication;
   wherein the third encrypted data are equal to data generated by making the logical calculation between the second encrypted data and the encrypted key data.

2. The non-transitory computer-readable storage medium according to claim 1, wherein:
   the calculation apparatus generates the third encrypted data by using the second encrypted data received from the computer and the encrypted key data received from the determination apparatus.

3. The non-transitory computer-readable storage medium according to claim 1, wherein at least one of the first key and the second key is generated using a specified key generation function.

4. A cryptographic processing method executed by a computer having a memory and a processor, the cryptographic processing method comprising:
   acquiring, by the processor, a first key and a second key different from the first key, from the memory;
   generating, by the processor, first encrypted data by making a logical calculation between data for authentication and the first key, and generating second encrypted data by making the logical calculation between the first encrypted data and the second key;
   transmitting, by the processor, the second encrypted data to a calculation apparatus which manages third encrypted data as registered data, the third encrypted data being generated by making the logical calculation between the first encrypted data and a third key; and
   transmitting, by the processor, the second key to a determination apparatus which maintains the third key, generates encrypted key data by making the logical calculation between a key received from the computer and the third key, and transmits the encrypted key data to the calculation apparatus;
   receiving an authentication result from the determination apparatus, wherein the authentication result is based on the data for authentication;
   wherein the third encrypted data are equal to data generated by making the logical calculation between the second encrypted data and the encrypted key data.

5. A cryptographic processing apparatus comprising:
   a memory configured to store a first key and a second key different from the first key; and
   a processor configured to perform a process including:
   generating first encrypted data by making a logical calculation between data for authentication and the first key, and generating second encrypted data by making the logical calculation between the first encrypted data and the second key;
   transmitting the second encrypted data to a calculation apparatus which manages third encrypted data as registered data, the third encrypted data being generated by making the logical calculation between the first encrypted data and a third key; and
   transmitting the second key to a determination apparatus which maintains the third key, generates encrypted key data by making the logical calculation between a key received from the cryptographic processing apparatus and the third key, and transmits the encrypted key data to the calculation apparatus;
   receiving an authentication result from the determination apparatus, wherein the authentication result is based on the data for authentication;
   wherein the third encrypted data are equal to data generated by making the logical calculation between the second encrypted data and the encrypted key data.

6. The cryptographic processing apparatus according to claim 5, wherein:
   the calculation apparatus generates the third encrypted data by using the second encrypted data received from the cryptographic processing apparatus and the encrypted key data received from the determination apparatus.

7. The cryptographic processing apparatus according to claim 5, wherein at least one of the first key and the second key is generated using a specified key generation function.

* * * * *